(12) United States Patent
Leroux

(10) Patent No.: US 11,035,476 B2
(45) Date of Patent: Jun. 15, 2021

(54) GATE VALVE

(71) Applicant: Slurryflo Valve Corporation, Edmonton (CA)

(72) Inventor: Marc Leroux, Edmonton (CA)

(73) Assignee: Slurryflo Valve Corporation, Edmonton (CA)

( * ) Notice: Subject to any disclaimer, the term of this patent is extended or adjusted under 35 U.S.C. 154(b) by 12 days.

(21) Appl. No.: 16/510,700

(22) Filed: Jul. 12, 2019

(65) Prior Publication Data

US 2020/0400236 A1  Dec. 24, 2020

(30) Foreign Application Priority Data

Jun. 20, 2019 (CA) .................. CA 3047469

(51) Int. Cl.
*F16K 3/02* (2006.01)

(52) U.S. Cl.
CPC .......... *F16K 3/0209* (2013.01); *F16K 3/0218* (2013.01); *F16K 3/0281* (2013.01)

(58) Field of Classification Search
CPC ..... F16K 3/0209; F16K 3/0218; F16K 3/0281
USPC .................................................. 251/326, 328
See application file for complete search history.

(56) References Cited

U.S. PATENT DOCUMENTS

| | | |
|---|---|---|
| 1,753,524 A | 4/1930 | Mawby |
| 2,011,100 A | 8/1935 | Woods |
| 2,550,984 A | 5/1951 | Ferguson |
| 2,701,117 A | 2/1955 | Bashark |
| 2,731,231 A | 1/1956 | Garrott |
| 2,825,528 A | 3/1958 | Truitt |
| 3,000,608 A | 9/1961 | Williams |
| 3,111,091 A | 11/1963 | Hopkinson |
| 3,190,305 A | 6/1965 | Schulze |
| 3,586,104 A | 6/1971 | Hyde et al. |
| 3,906,992 A | 9/1975 | Leach |
| 4,009,727 A | 3/1977 | Bailey |
| 4,234,008 A | 11/1980 | Cronfel |
| 4,354,663 A | 10/1982 | Vanderburg et al. |
| 4,377,274 A | 3/1983 | Mayhew, Jr. |
| 4,483,514 A | 11/1984 | Kennedy |
| 4,512,363 A | 4/1985 | Jandrasi et al. |

(Continued)

FOREIGN PATENT DOCUMENTS

| | | |
|---|---|---|
| CA | 2560666 C | 10/2005 |
| EP | 2287538 A1 | 2/2011 |

(Continued)

OTHER PUBLICATIONS

"GS Sliding Gate Control Valves," <http://www.bvalve.es> [retrieved Jun. 10, 2019], 1 page.

(Continued)

*Primary Examiner* — Robert K Arundale
(74) *Attorney, Agent, or Firm* — Christensen O'Connor Johnson Kindness, PLLC

(57) ABSTRACT

A gate valve having a seat plate with a recessed face smaller in width than a bore of the valve. The recessed face includes an opening, which can be generally rectangular for use of the valve as a substantially linear control valve. The valve closes by movement of the gate along the recessed face to obstruct the opening, and opens by the reverse movement.

5 Claims, 26 Drawing Sheets

(56) References Cited

U.S. PATENT DOCUMENTS

| | | | |
|---|---|---|---|
| 4,693,452 A * | 9/1987 | Jandrasi | F16K 3/316 |
| | | | 251/326 |
| 4,798,365 A * | 1/1989 | Mayhew | F16K 3/0218 |
| | | | 137/375 |
| 5,101,849 A | 4/1992 | Richard | |
| 5,280,806 A | 1/1994 | Glazebrook | |
| 5,330,158 A | 7/1994 | Ellich et al. | |
| 5,449,146 A | 9/1995 | Weagraff | |
| 5,464,035 A | 11/1995 | Heinecke | |
| 5,653,423 A | 8/1997 | Young et al. | |
| 5,890,700 A | 4/1999 | Clarkson et al. | |
| 5,895,028 A | 4/1999 | Varady | |
| 5,938,175 A | 8/1999 | Young et al. | |
| 6,145,544 A | 11/2000 | Dutertre et al. | |
| 6,293,306 B1 | 9/2001 | Brenes | |
| 6,311,949 B1 | 11/2001 | Iida et al. | |
| 6,446,664 B1 | 9/2002 | Parsons | |
| 6,637,457 B2 | 10/2003 | Evanovich et al. | |
| 6,745,999 B1 | 6/2004 | Heinecke et al. | |
| 7,028,984 B2 | 4/2006 | Wang | |
| 7,431,264 B2 | 10/2008 | Leroux | |
| 8,132,961 B1 | 3/2012 | England et al. | |
| 8,312,931 B2 | 11/2012 | Xu et al. | |
| 9,651,186 B2 | 5/2017 | Ahuja et al. | |
| 10,145,501 B2 | 12/2018 | Fisher | |
| 2009/0236554 A1 | 9/2009 | Gifford et al. | |
| 2013/0025719 A1 | 1/2013 | Yang | |
| 2014/0154107 A1 | 6/2014 | Chatfield et al. | |
| 2015/0096641 A1 | 4/2015 | Chow et al. | |
| 2015/0354711 A1 | 12/2015 | Palomeque | |
| 2016/0017903 A1 | 1/2016 | Abe | |
| 2016/0063143 A1 | 3/2016 | Lawson et al. | |
| 2017/0023034 A1 | 1/2017 | Kerr | |
| 2017/0370385 A1 | 12/2017 | Reckner et al. | |
| 2018/0202559 A1 | 7/2018 | Freeman, III | |

FOREIGN PATENT DOCUMENTS

| | | |
|---|---|---|
| FR | 2845129 B1 | 4/2006 |
| KR | 20160081045 A1 | 7/2016 |

OTHER PUBLICATIONS

"Stainless Steel Lined Resilient Seated Knife Gate Valve," <http://www.fnw.com> [retrieved Mar. 18, 2019], 4 pages.

"Options for Uni-Directional Knife Gate Valves," <http://www.vaasval.com> at least as early as Aug. 2011, 12 pages.

Monsen, J., "Liquid Flow in Control Valves—Choked Flow, Cavitation and Flashing," <http://www.valin.com> [retrieved Jan. 30, 2017], 8 pages.

"Fabri-Valve—Slide Gate Valve—Figure F 39," ITT Industries, Federal Way, Wash., 2004, 4 page pamphlet.

Dezurik, "SPX Valves & Controls," Bulletin of the SPX Valves and Controls, Minnesota Bulletin 37.00-2:1-4, May 2001.

\* cited by examiner

GATE VALVE

TECHNICAL FIELD

Gate Valves

BACKGROUND

Gate valves are commonly used in the mining, pulp and paper, and food handling industries, among others. As known in the art, the gate moves linearly, perpendicular to the direction of flow. Typically, gate valves are used in a fully opened or fully closed position, and generally considered not suitable for throttling applications. The typical gate valve has an opening corresponding to the full bore of the valve, and is shaped to occupy all or substantially all of the bore when fully closed.

The traditional gate valve design may create flow characteristics not desirable for throttling applications. In CA patent 2489079 a gate shape was disclosed with beneficial flow characteristics. Also disclosed in that patent was an insert that can have an opening with various shapes. The insert as disclosed was planar, with the gate sliding against the insert. Slurryflo Valve Corp has sold under that patent valves with inserts with various shapes of opening. These valves with inserts can provide flow centralization benefits wherein the jet of flow through the opening in the insert is directed in a relatively central manner so as to reduce potential damage to downstream pipes from abrasive materials flowing through the valve. However, it would be beneficial to further improve the flow centralization.

SUMMARY

A gate valve has a valve body and a guide attached to the valve body. The valve body defines a bore which has a bore width. Within the valve body, there is a seat plate having a recessed face in an upstream direction, the recessed face having a width less than the bore width and including a lip defining an opening in the seat plate. A gate is movable within the guide into the bore into an extended position at which the gate lies against the recessed face to obstruct the opening, and moveable within the guide out of the bore from the extended position.

These and other aspects of the device and method are set out in the claims.

BRIEF DESCRIPTION OF THE FIGURES

Embodiments will now be described with reference to the figures, in which like reference characters denote like elements, by way of example, and in which.

DETAILED DESCRIPTION

Immaterial modifications may be made to the embodiments described here without departing from what is covered by the claims.

Figure 1:
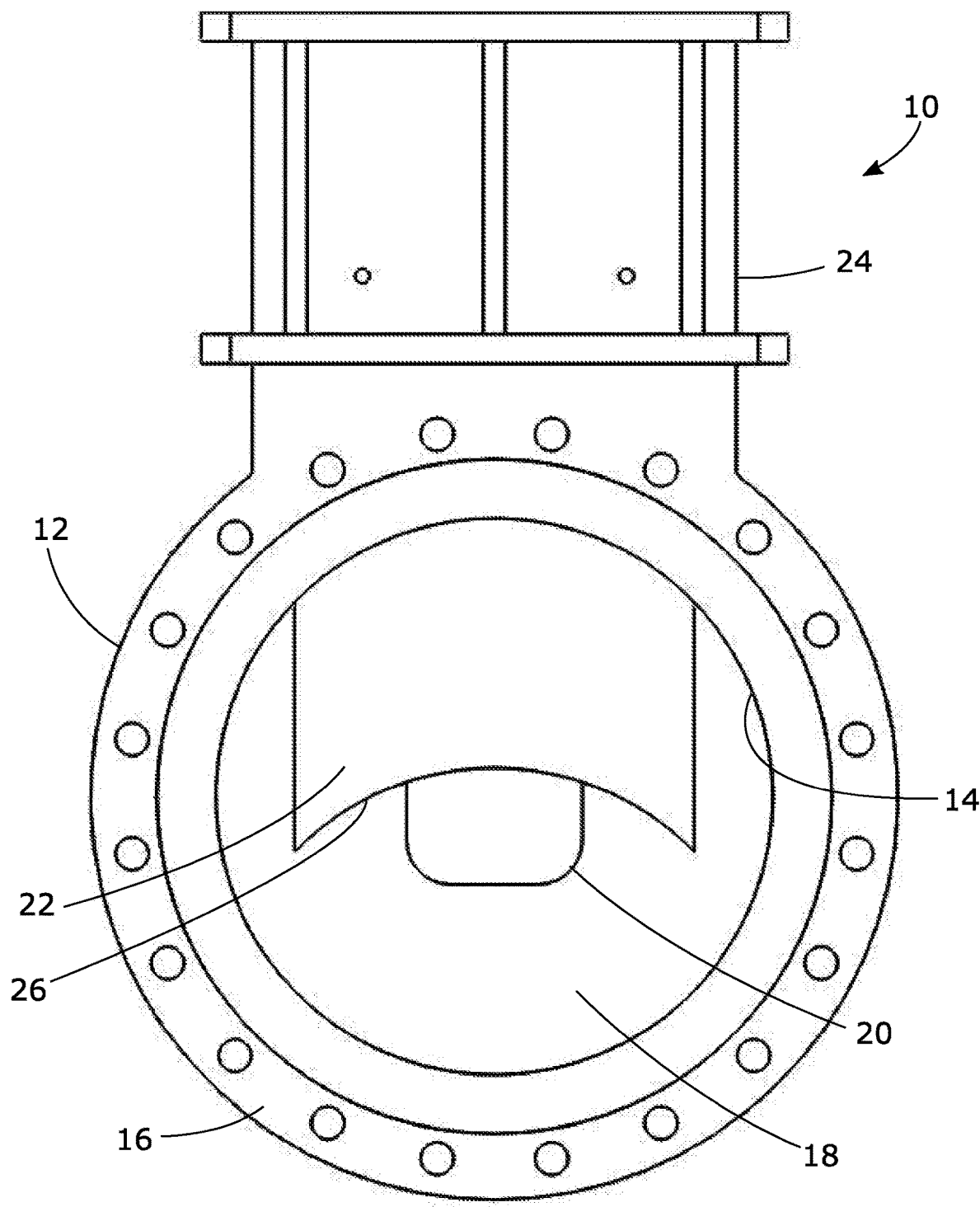
FIG. 1 is a front view of a prior art gate valve.

FIG. 1 is a front view of an example valve 10. The valve 10 has a valve body 12 defining a bore 14. The valve body 12 is suitable for attachment to pipes of the same or similar internal diameter as the bore 14, using attachment flange 16 suitable for attachment to a flange of a pipe. Within the bore 14 is a seat plate 18 partially obstructing the bore. The seat plate 18 defines an opening 20. A valve gate 22 is movable to obstruct and expose the opening 20. The valve gate 22 moves within a guide 24 attached to the valve body 12 and which is typically perpendicular to the bore 14. The valve gate 22 moves between an extended position at which the gate 22 lies against the seat plate 18 to obstruct the opening 20, and a retracted position where, in this particular embodiment, the valve gate 22 fully exposes the opening 20. Fluid can flow through the opening 20 from an upstream end of the bore 14 (shown facing the viewer in this figure) to a downstream end of the bore 14, when the opening 20 is exposed. When the opening 20 is fully obstructed, little or no fluid flow can occur through opening 20, and if there are no other holes in the valve seat 18, or other bypass arrangements, then flow from the upstream end of the bore 14 to the downstream end of the bore 14 will be prevented. As the gate 22 moves between the extended position and the retracted position, the flow gradually increases.

Figure 2:
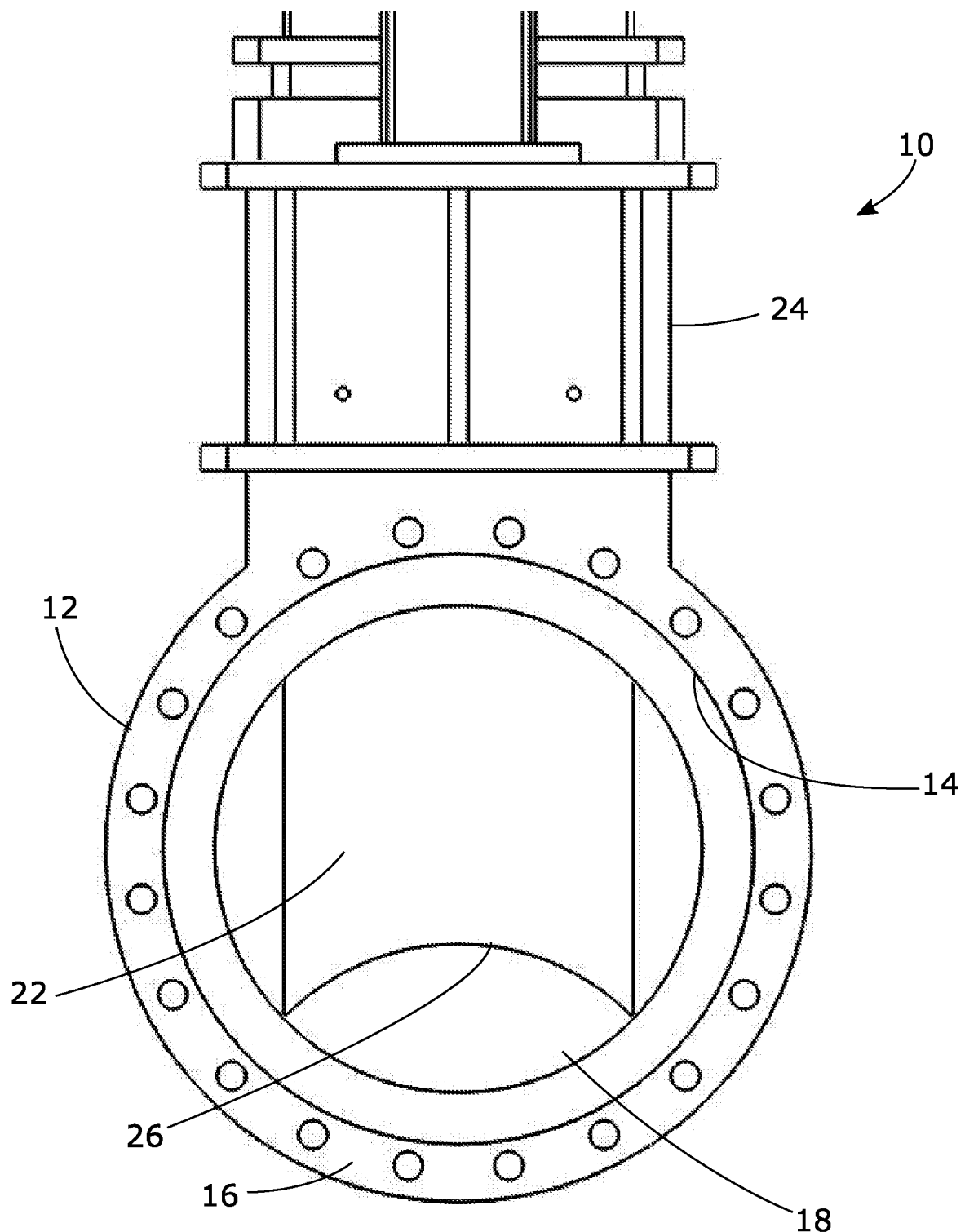
FIG. 2 is a front view of the valve of FIG. 1 with the gate in an extended position.

FIG. 1 shows the valve 10 with the gate 22 in an intermediate position between the extended and retracted positions. FIG. 2 shows another front view of the valve 10 of FIG. 1, but with the gate in an extended position so that the gate 22 fully covers the opening.

Figure 3:
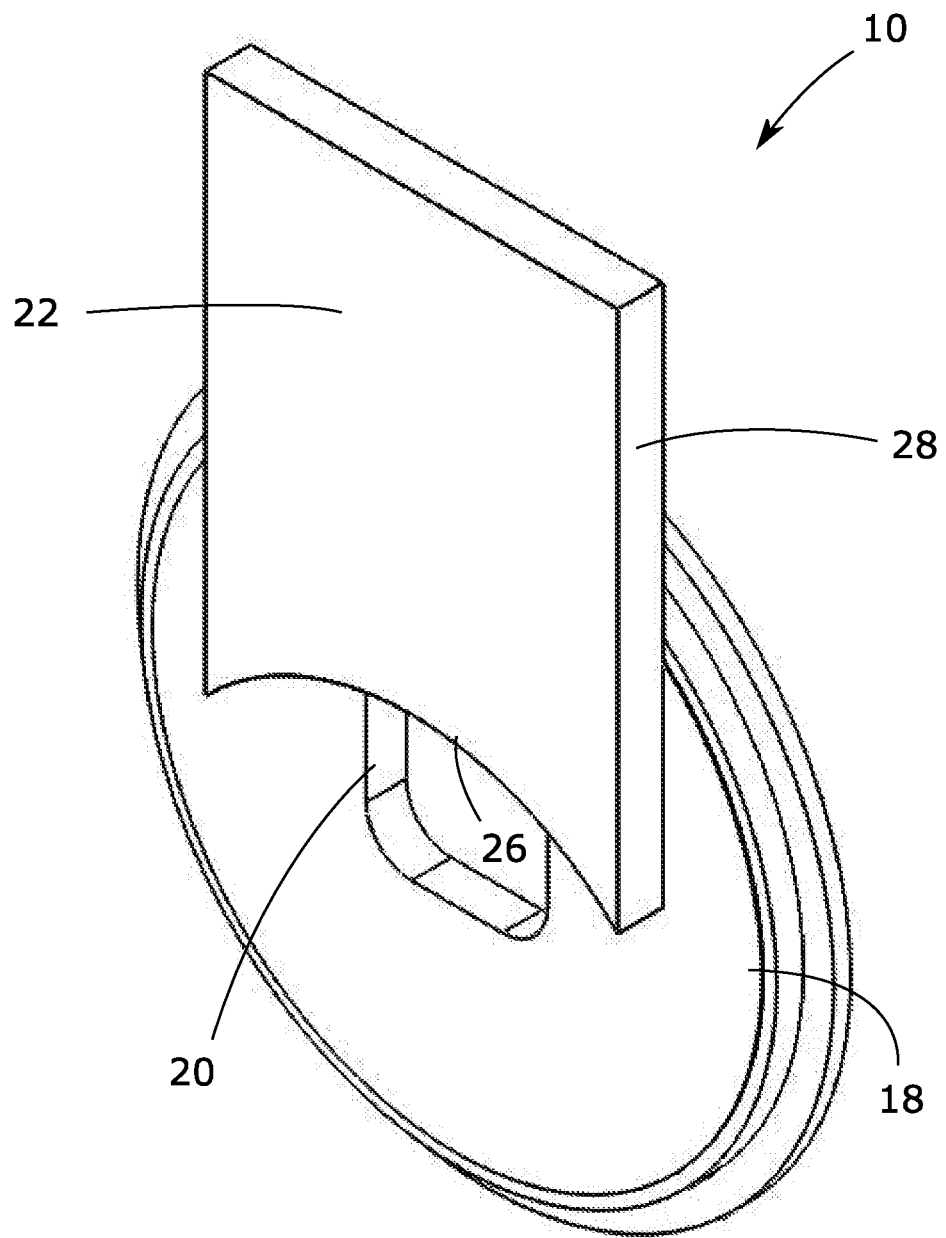
FIG. 3 is an isometric view of the gate and seat plate of the valve of FIG. 1.

FIG. 3 is an isometric view of the gate 22 and seat plate 18 of FIG. 1. In the valve of FIGS. 1-3, the valve gate is adjacent to the seat plate in an upstream direction. The relationship between the components is most easily seen in FIG. 3 where a side 28 of the gate 22 is visible. This results in the centre of the gate and the upstream face of the gate being upstream of the upstream face of the seat plate. This can result in a jet of fluid flow being directed upwards to pipe walls downstream of the valve, or in the direction facing the guide when the guide is not oriented above the valve body. This deflection of flow is particularly strong when the valve is close to the extended position but not fully obstructing the opening.

The gate 22 of the embodiment shown in FIGS. 1-3 has a leading edge 26 which is flush with a profile of the bore 14 when the gate 22 is in the retracted position. This can provide improved flow characteristics as described in CA patent 2489079.

Figure 4:
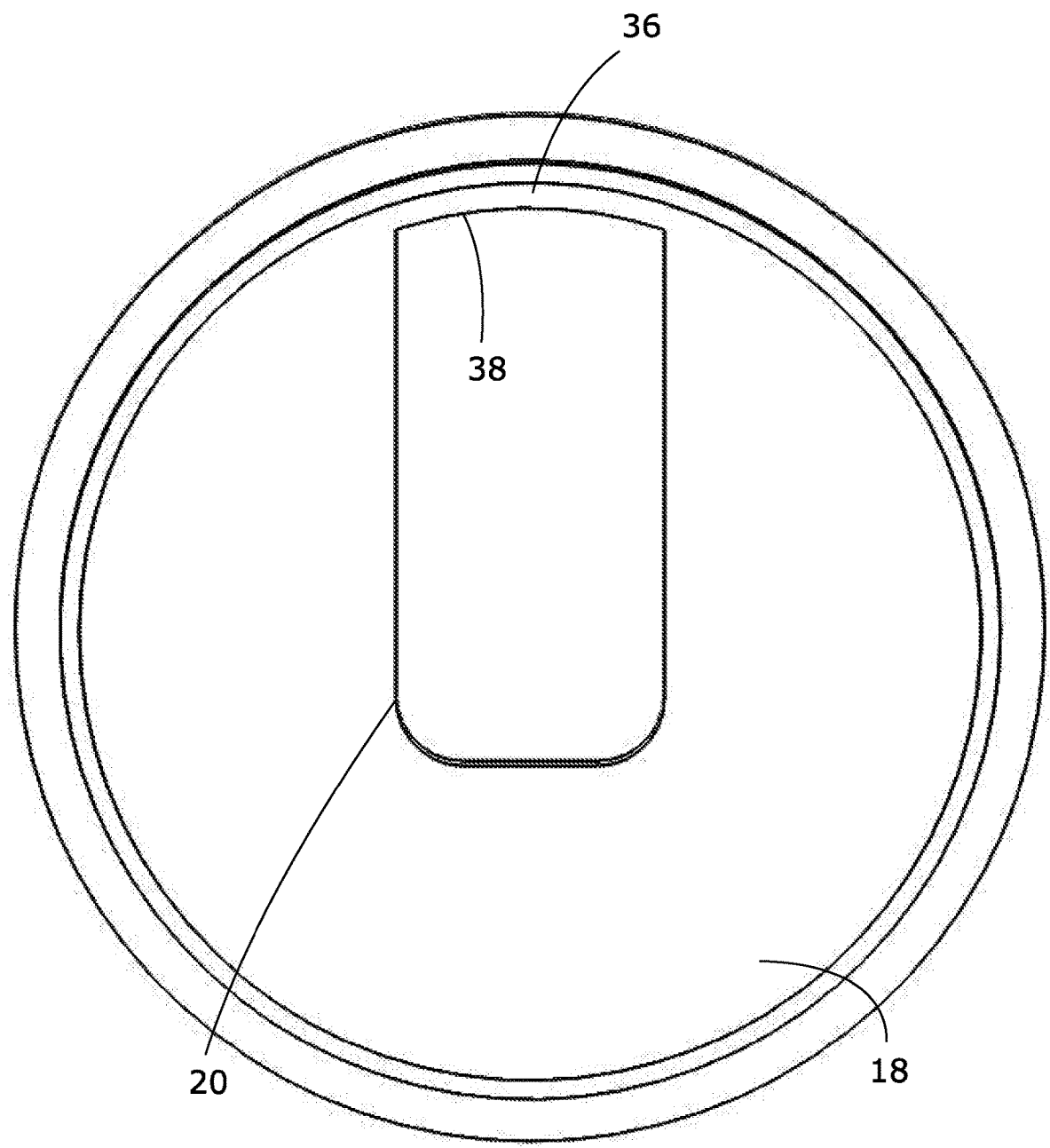
FIG. 4 is a front view of the seat plate of the valve of FIG. 1.

FIG. 4 shows the seat plate 18 of FIGS. 1-3 without the gate 22, making visible an upper portion 36 of the seat plate 18 extending above the opening 20. This upper portion 36 is outside of the bore when the seat plate 18 is installed in the valve 10, such that an inner edge 38 of the seat plate 18 corresponds to an inner wall of the bore minimizing the disruption of the flow. The seat plate 18 as shown in FIGS. 1-4 is circularly shaped and has an outer boundary extending outside the bore and corresponding to outer walls of the bore.

In the figures, the valve is shown oriented with the guide above the valve body so that the gate moves downwards into the extended position. The valve could have any orientation, but for simplicity of description terms such as "upper" and "below" are used here which should be understood as describing the relative positioning of elements of the valve when the valve is in the orientation shown, and not necessarily corresponding to the positioning of elements when the valve is in some other orientation.

Figure 5:
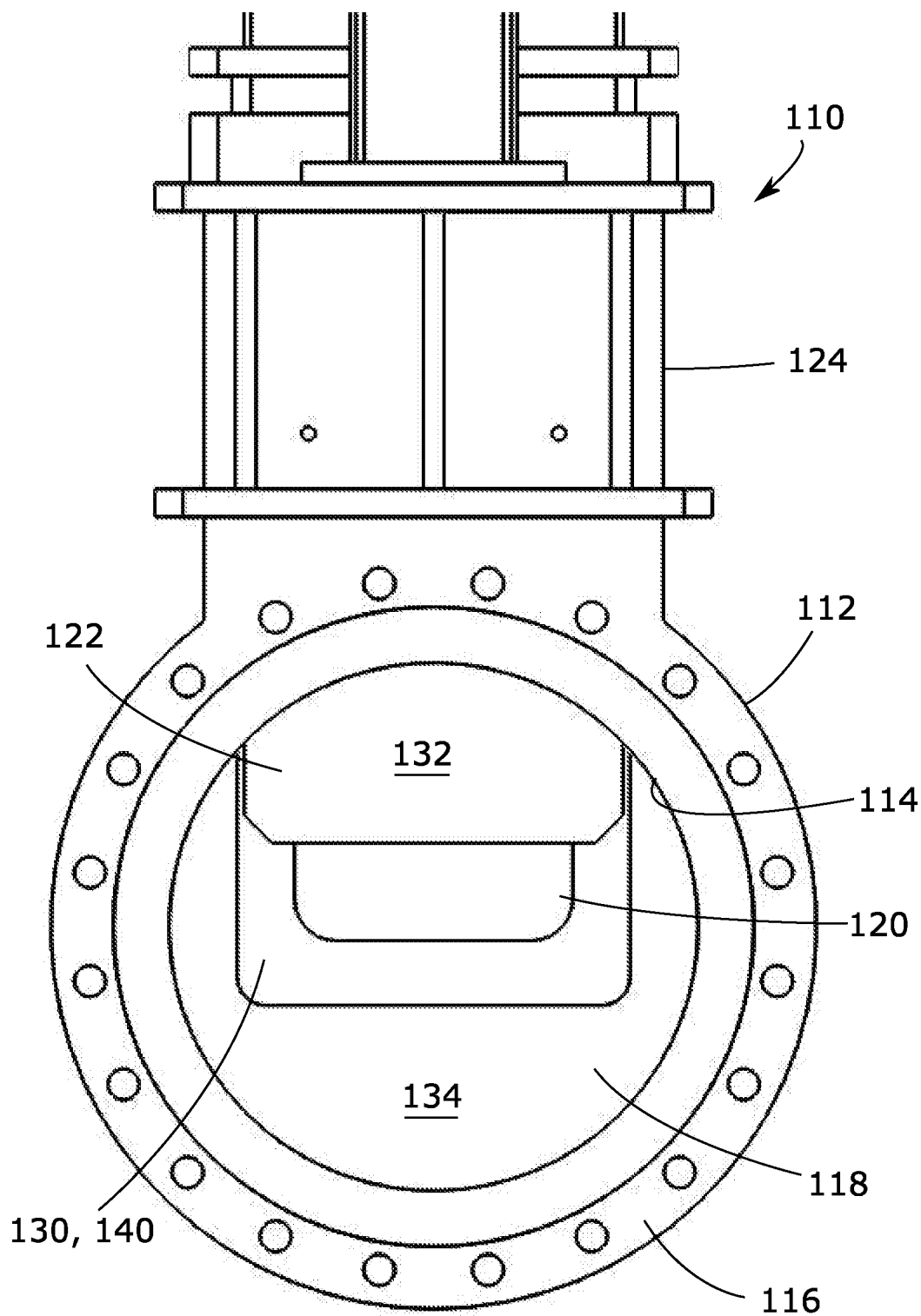
FIG. 5 is a front view of an exemplary gate valve.

To reduce flow decentralization, a valve 110 is provided as shown in FIG. 5 having a seat plate 118 with a recessed face 130 in the upstream direction, the recessed face 130 being smaller in width than the bore 114. This has been found by simulation to reduce flow deflection. The gate 122 and seat plate 118 of valve 110 are shown in FIG. 5. The valve body 112 including the bore 114 and flange 116, and the valve guide 124, may be for example as their counterparts in FIG. 1. The guide can be any conventional gate valve guide and can have manual or actuated movement of the gate within the valve guide. In the embodiment shown in FIG. 5, the recessed face 130 receives the gate 122, the gate 122 having a width less than or the same as the recessed face 130 including the opening 120. The gate having a width less than or the same as the recessed face including the opening allows the gate 122 to have an upstream face 132 which is coplanar with an upstream face 134 of the seat plate outside of the recessed face 130. The position of the gate 122 within the seat plate 118 helps reduce the deflection of the flow to reduce erosion of downstream pipe walls.

The recessed face 130 includes a lip 140 extending in the embodiments shown all the way around the opening 120. In other embodiments, there may be no lip around some parts of the opening, for example the top or the bottom of the opening or both. The recessed face is defined here as including the opening and the lip, regardless of whether the lip extends all the way around the opening. The use of a flat gate sliding against a lip extending around the opening helps with sealing, but the absence of the lip at top and bottom could allow the gate to be shaped to extend into the opening and have upstream and downstream faces coplanar with upstream and downstream faces of the seat plate.

Figure 6:
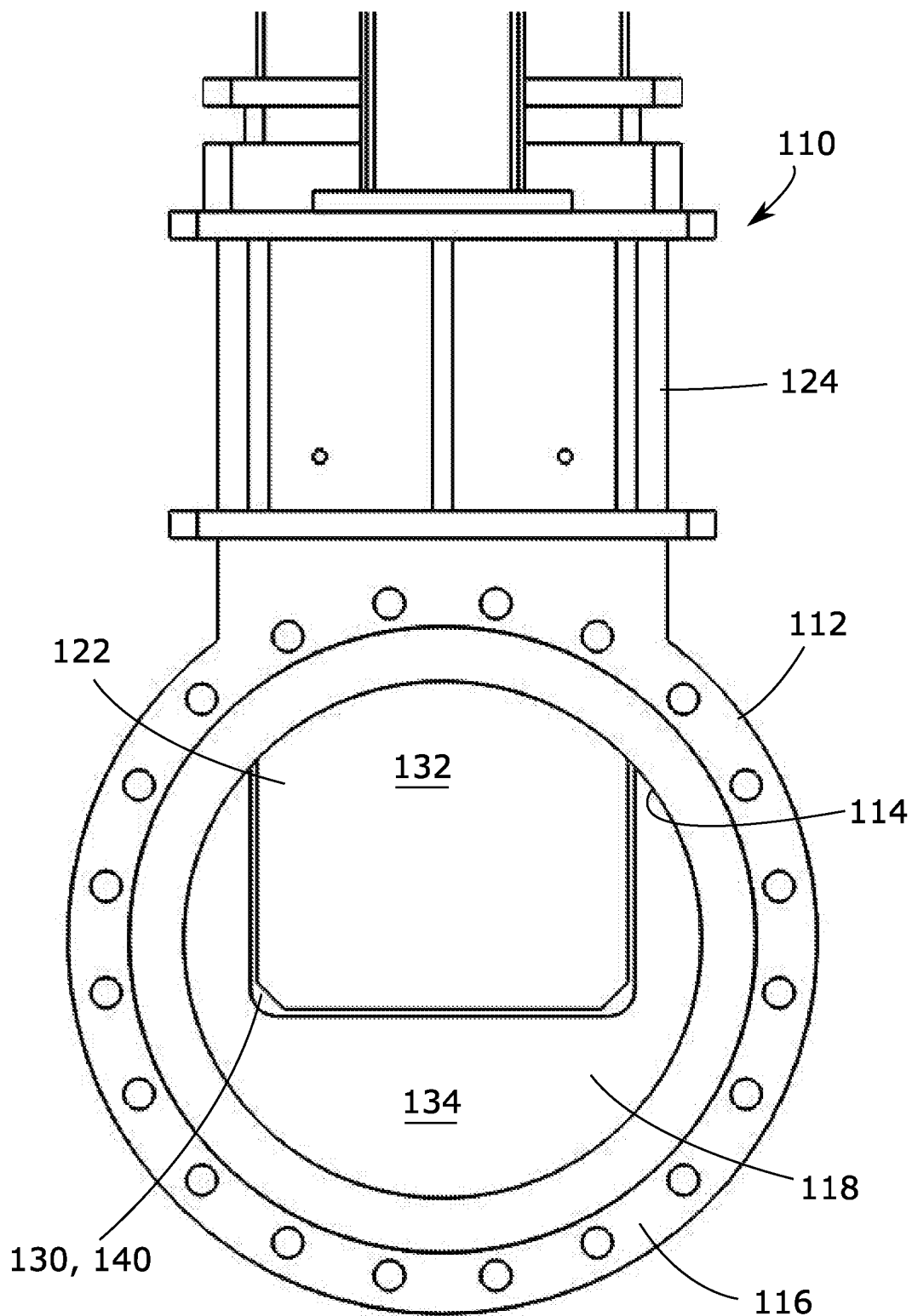
FIG. 6 is a front view of the gate valve of FIG. 5 with the gate in an extended position.
Figure 7:
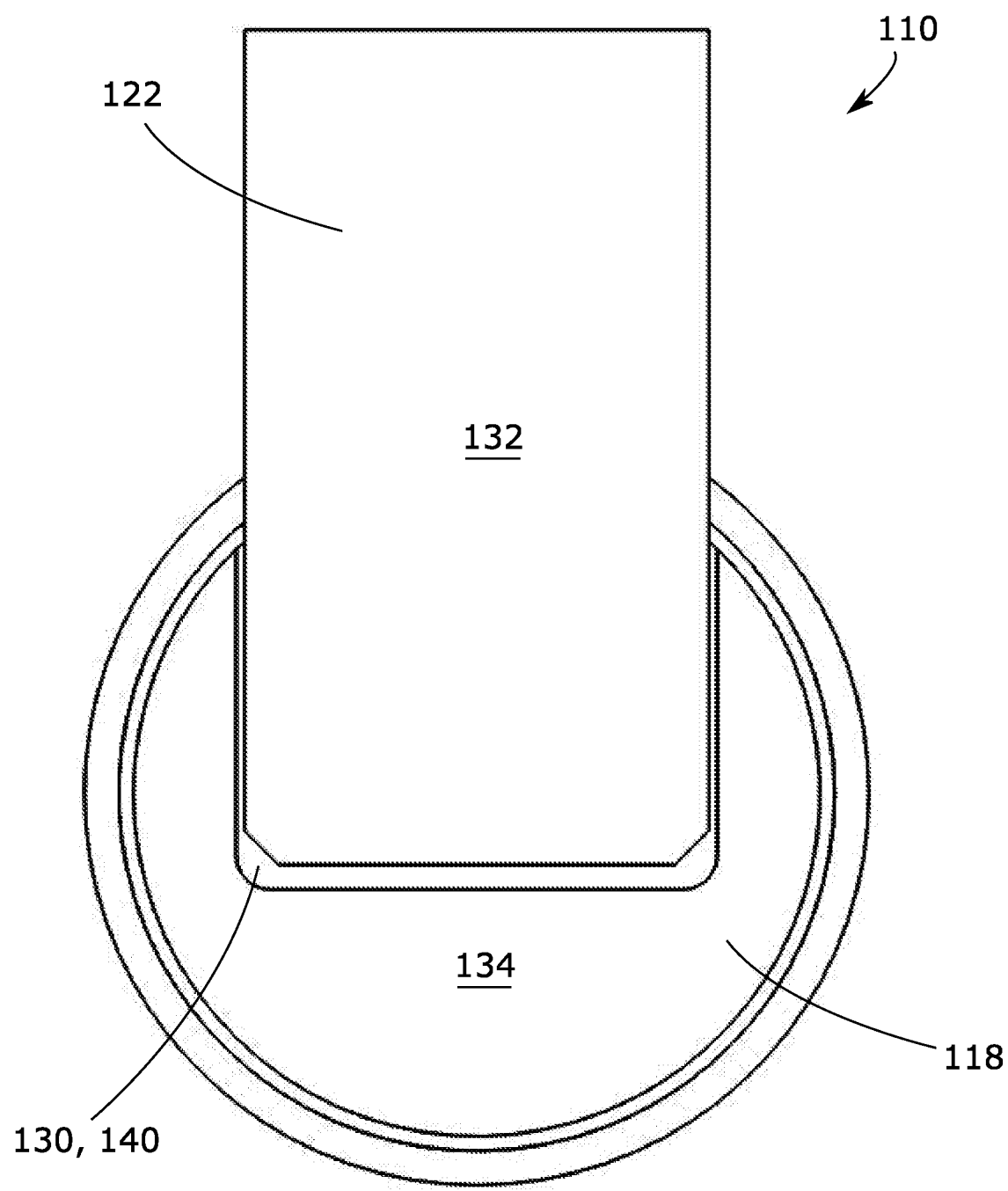
FIG. 7 is a front view of the gate and seat plate of the valve of FIG. 5, with the gate and seat plate in a slightly different extended position than shown in FIG. 6.
Figure 8:
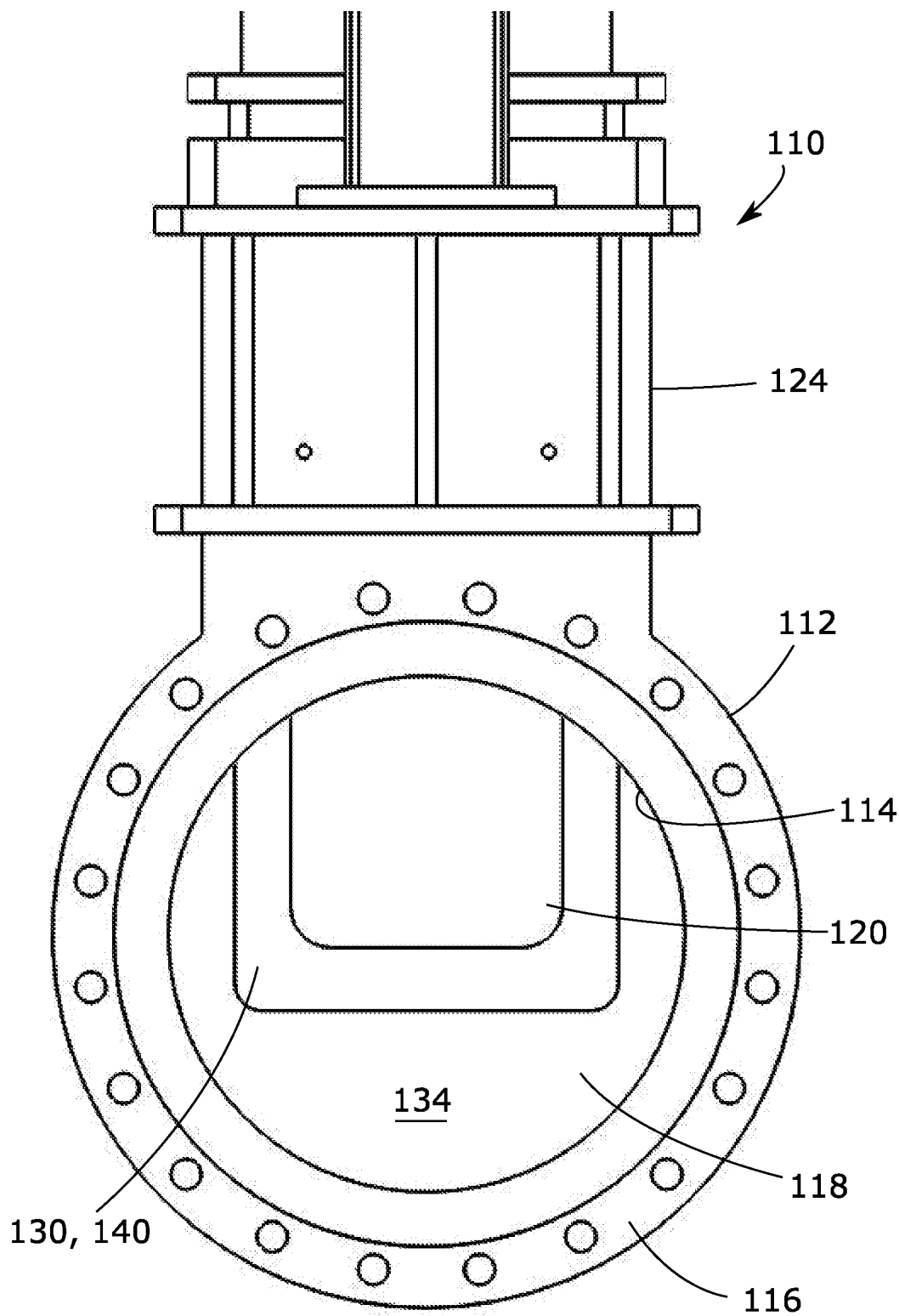
FIG. 8 is a front view of the valve of FIG. 5 with the gate in a retracted position.

FIG. 5 shows valve 110 having the gate 122 in a position partially covering the opening 120 of seat plate 118. FIG. 6 is another front view of the valve 110 of FIG. 5, showing the gate 122 in an extended positioning at which it fully covers the opening. FIG. 7 shows the gate 122 and seat plate 118 of the valve 110, in another extended position in which the gate 122 fully covers the opening. FIG. 8 shows the valve 110 with the gate in a fully retracted position. In this embodiment the gate is not visible at all from the front (upstream direction) in the fully retracted position.

Figure 9:
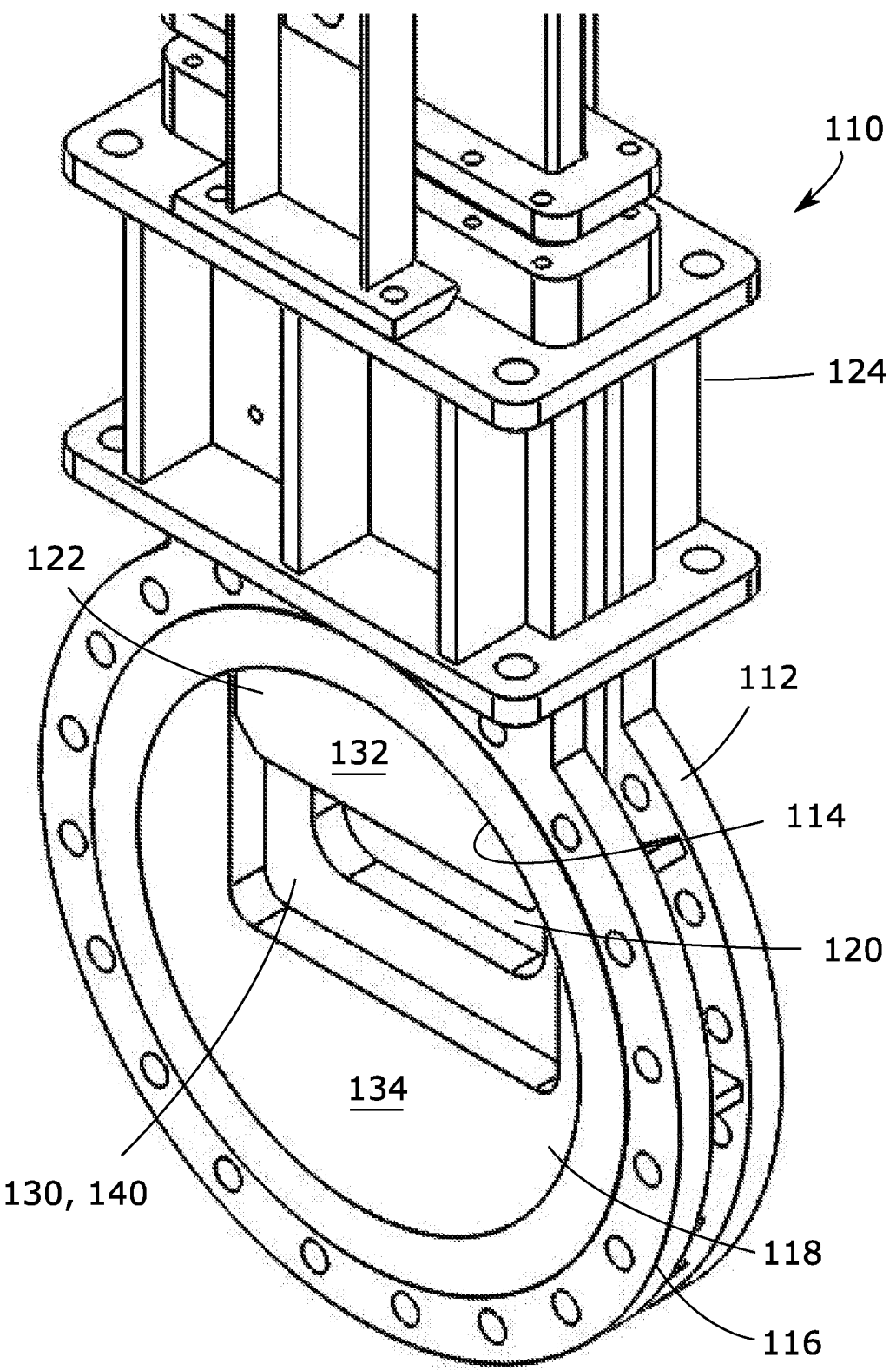
FIG. 9 is an isometric view of the valve of FIG. 5.
Figure 10:
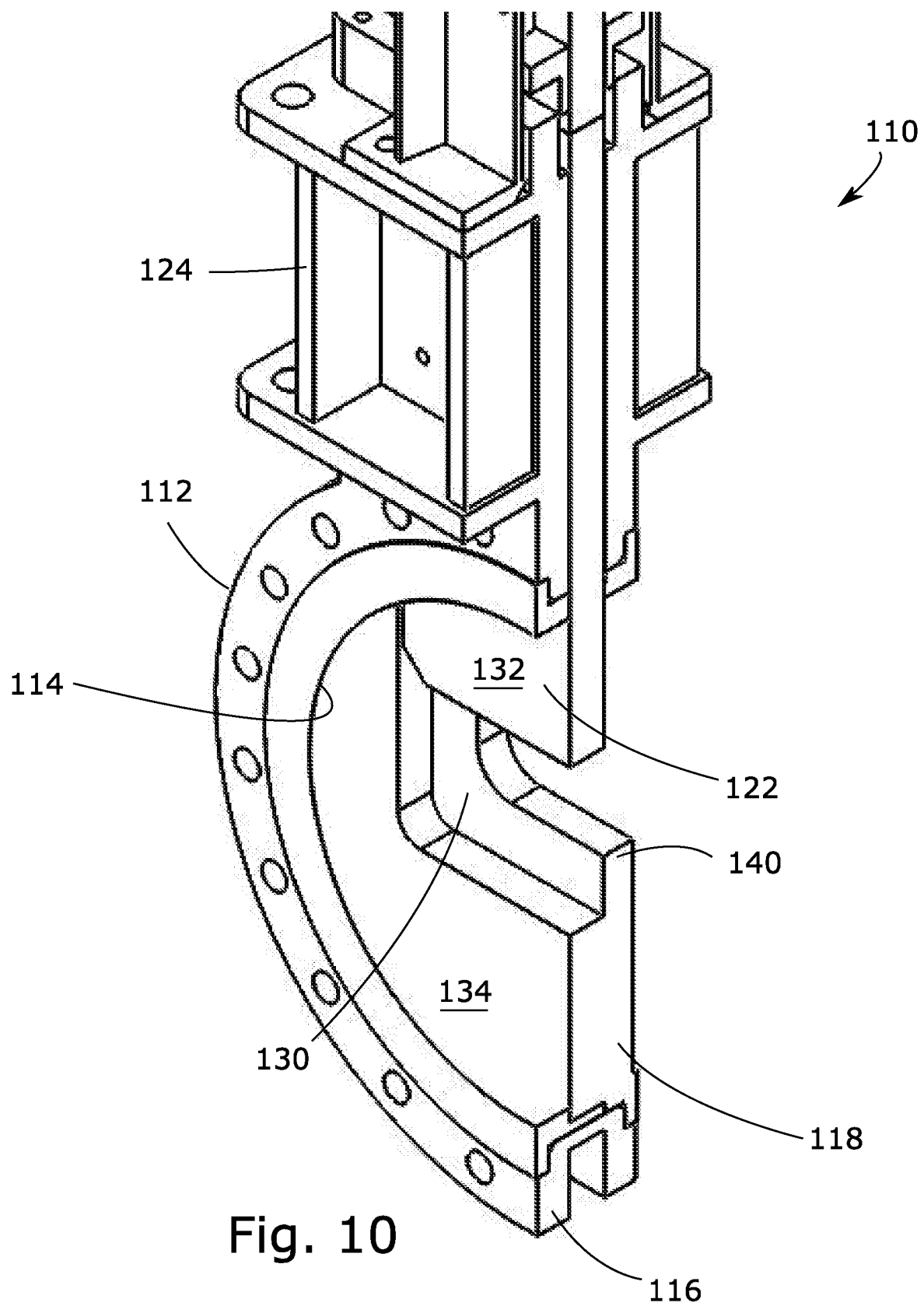
FIG. 10 is a cutaway isometric view of the valve of FIG. 5.
Figure 11:
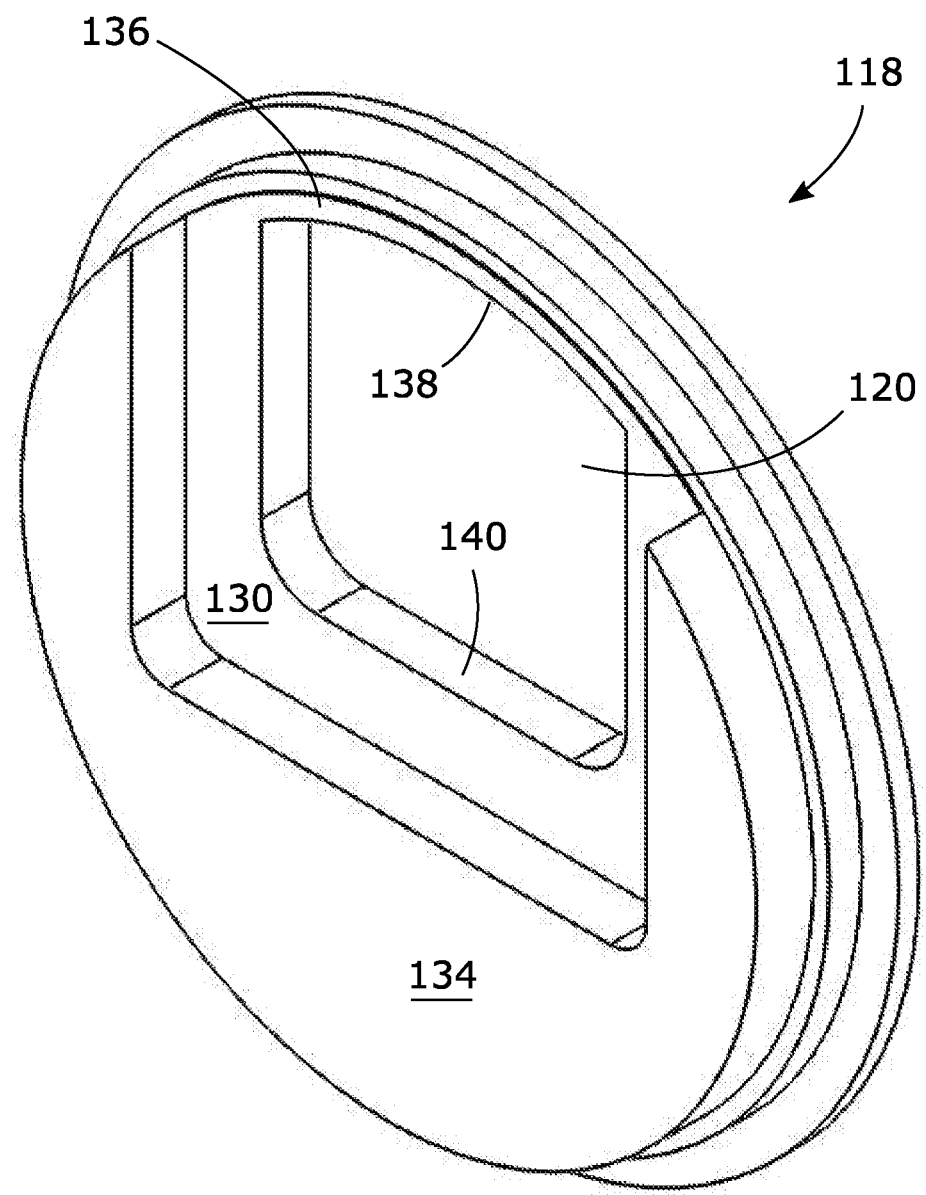
FIG. 11 is an isometric view of the seat plate of the valve of FIG. 5.

FIG. 9 shows an isometric view of the valve 110. FIG. 10 is a cutaway isometric view showing the relationship between the seat plate 118 and other components of the valve body 112 in this embodiment. FIG. 11 shows the seat plate 118 in isometric view. In FIG. 11, an upper portion 136 of the recessed face 130 is visible extending above the opening 120. This upper portion 136 is outside of the bore when the seat plate 118 is installed in the valve 110, such that an inner edge 138 of the seat plate 118 corresponds to an inner wall of the bore minimizing the disruption of the flow. Unlike the upper portion 36 and inner edge 38 of FIG. 4, the upper portion 136 of FIG. 11 is part of the recessed face 130, recessed away from upstream face 134.

Figure 12:
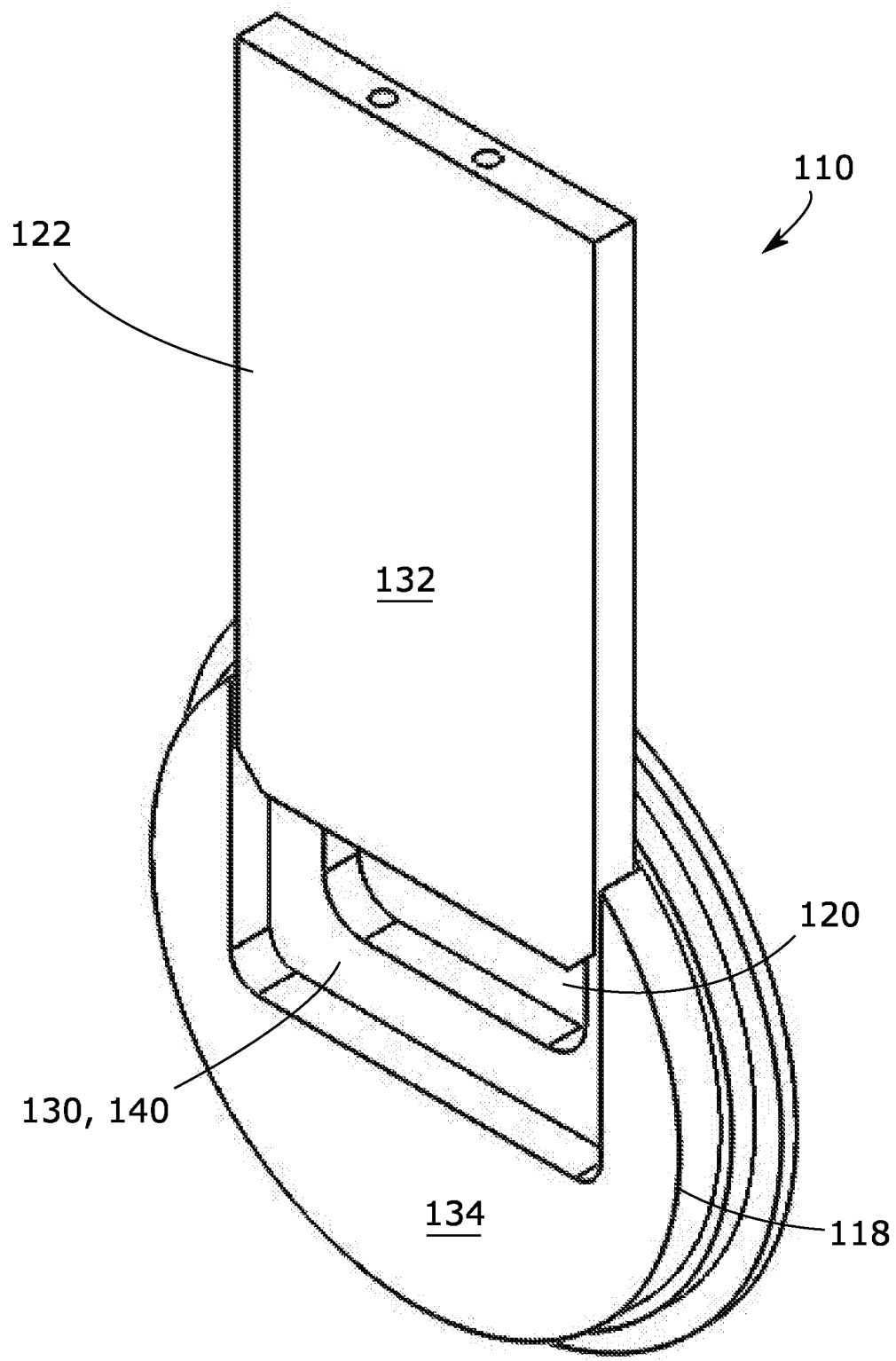
FIG. 12 is an isometric view of the gate and seat plate of the valve of FIG. 5.

FIG. 12 is an isometric view of the seat plate 118 and gate 122 of the valve 110. This view enables it to be better seen that face 132 of gate 122 is flush with face 134 of seat plate 118 in this embodiment.

Figure 13:
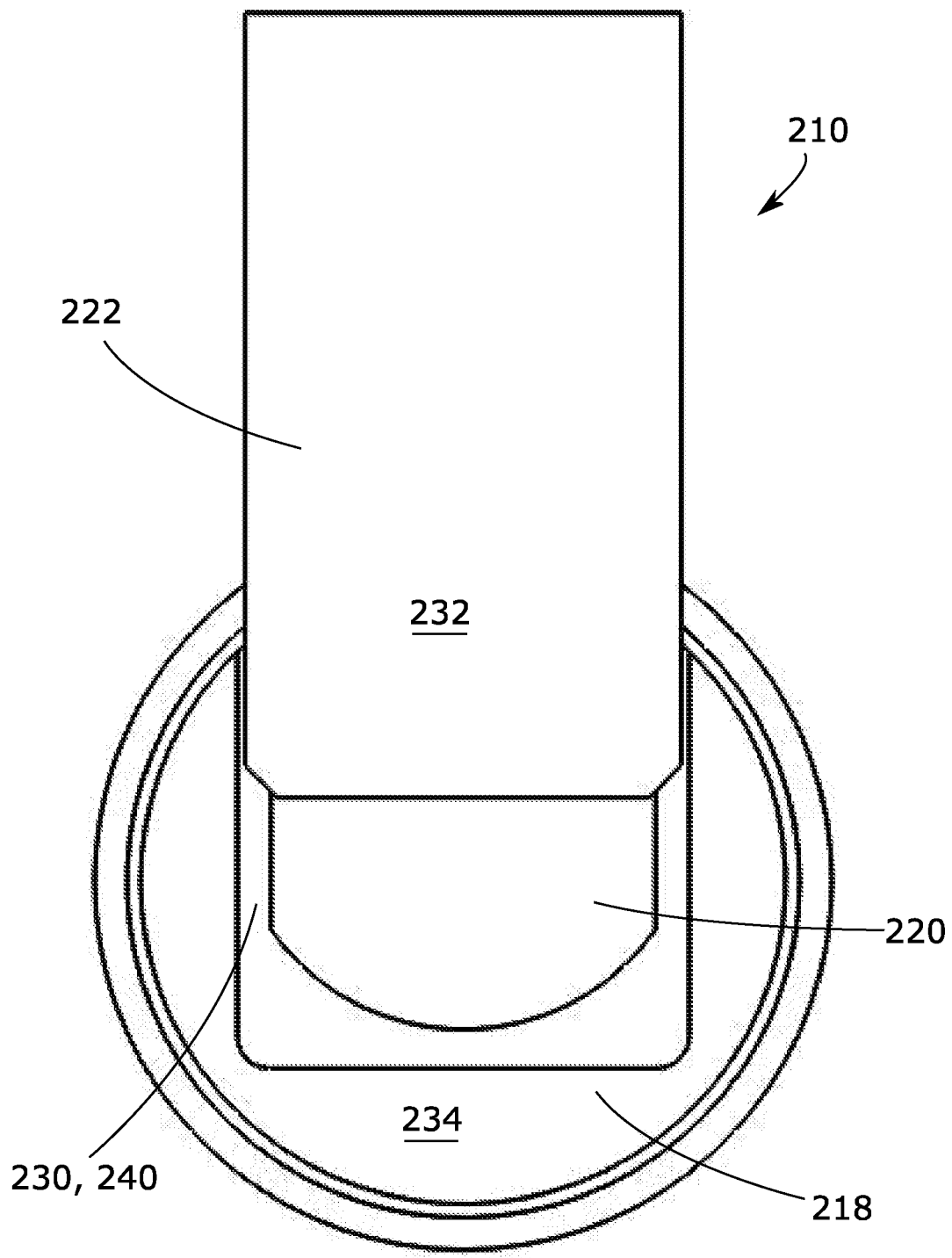
FIG. 13 is a front view of the gate and seat plate of another exemplary valve.

FIG. 13 shows a front view of a seat plate 218 and gate 222 of another valve 210. This valve has a differently shaped opening 220 with a rounded bottom. The lip 240 of recessed face 230 is shaped to define opening 220 while the recessed face 230 as a whole maintains a similar shape to the recessed face 130 of the embodiment of FIGS. 5-12, and accommodates a gate 222 similar in shape to the gate 122 of the embodiment of FIGS. 5-12. upstream face 232 of the gate 222 may be coplanar with upstream face 234 of seat plate 218, as with the corresponding elements of the embodiment of FIGS. 5-12.

Figure 14:
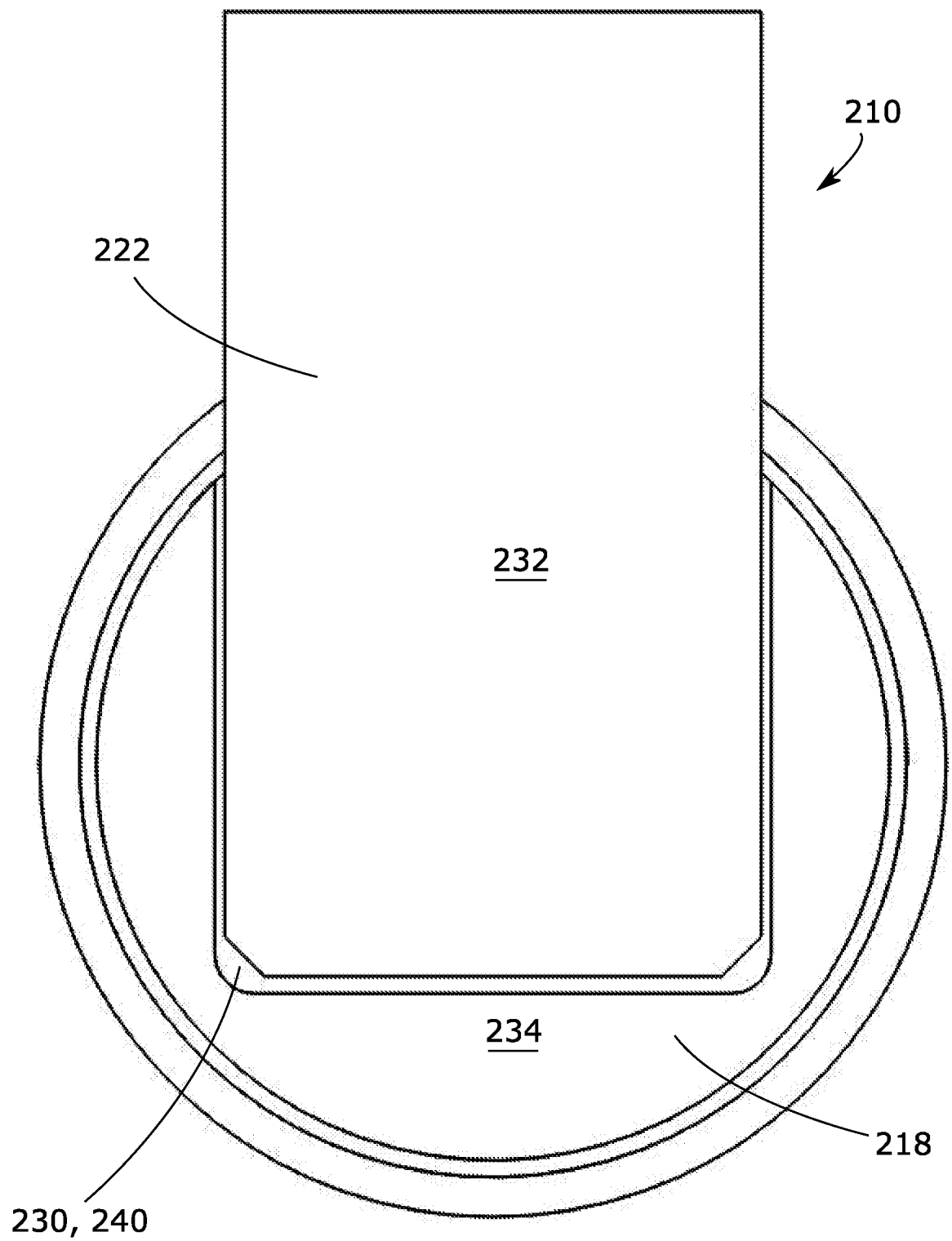
FIG. 14 is a front view of the gate and seat plate of the valve of FIG. 13, with the gate in an extended position.

FIG. 14 shows the gate 222 in an extended position to fully obstruct the opening in the seat plate 218.

Figure 15:
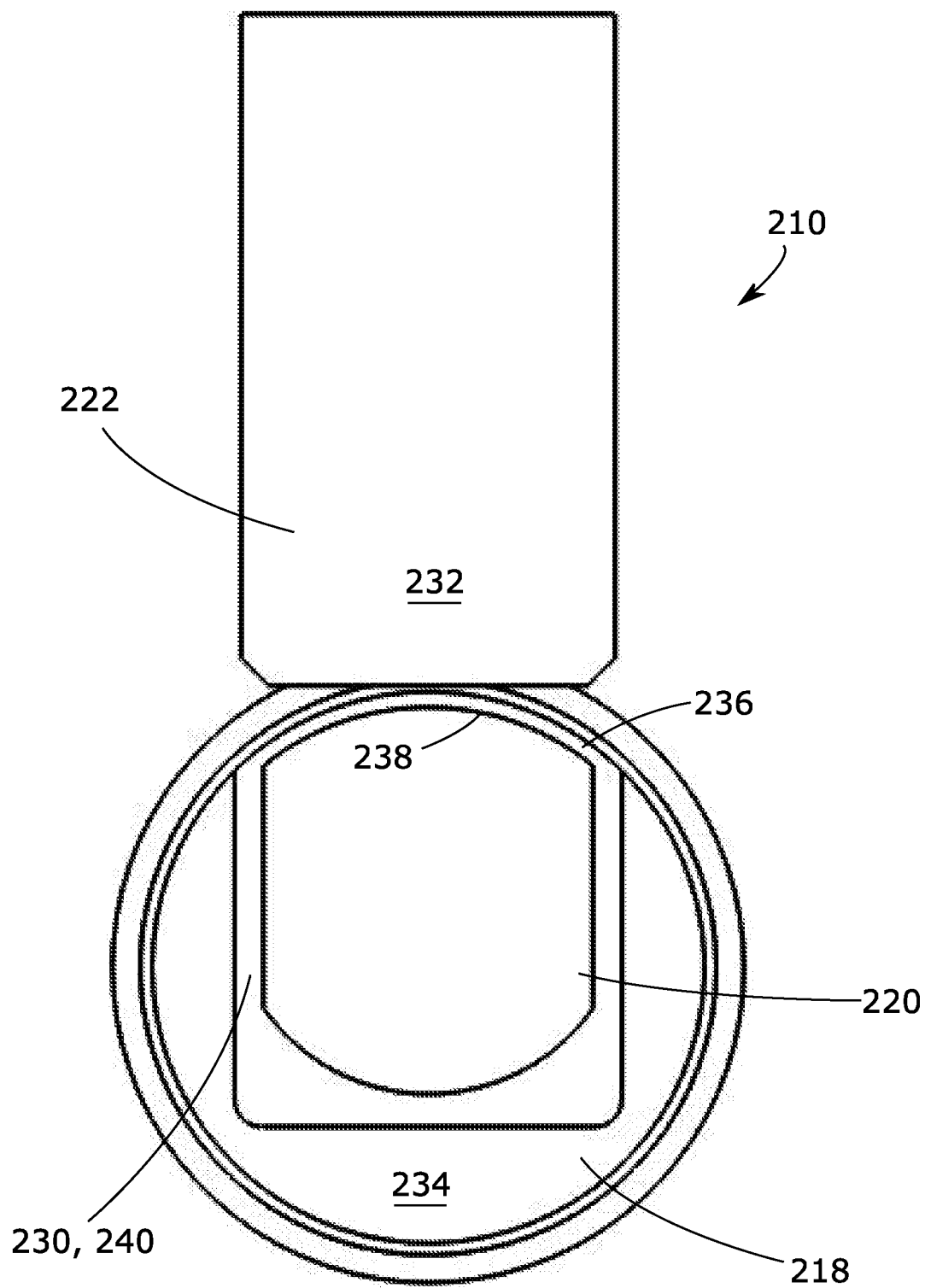
FIG. 15 is a front view of the gate and seat plate of the valve of FIG. 13, with the gate in a retracted position.

FIG. 15 shows the gate 222 in a fully retracted position where the opening 220 is fully exposed. In FIG. 7, an upper portion 236 of the seat plate 218 is visible extending above the opening 220. This upper portion 236 is outside of the bore when the seat plate 218 is installed in the valve 210, such that an inner edge 238 of the seat plate 218 corresponds to an inner wall of the bore minimizing the disruption of the flow. The upper portion 236 is part of lip 240 of the recessed face 230, recessed away from upstream face 234.

Figure 16:
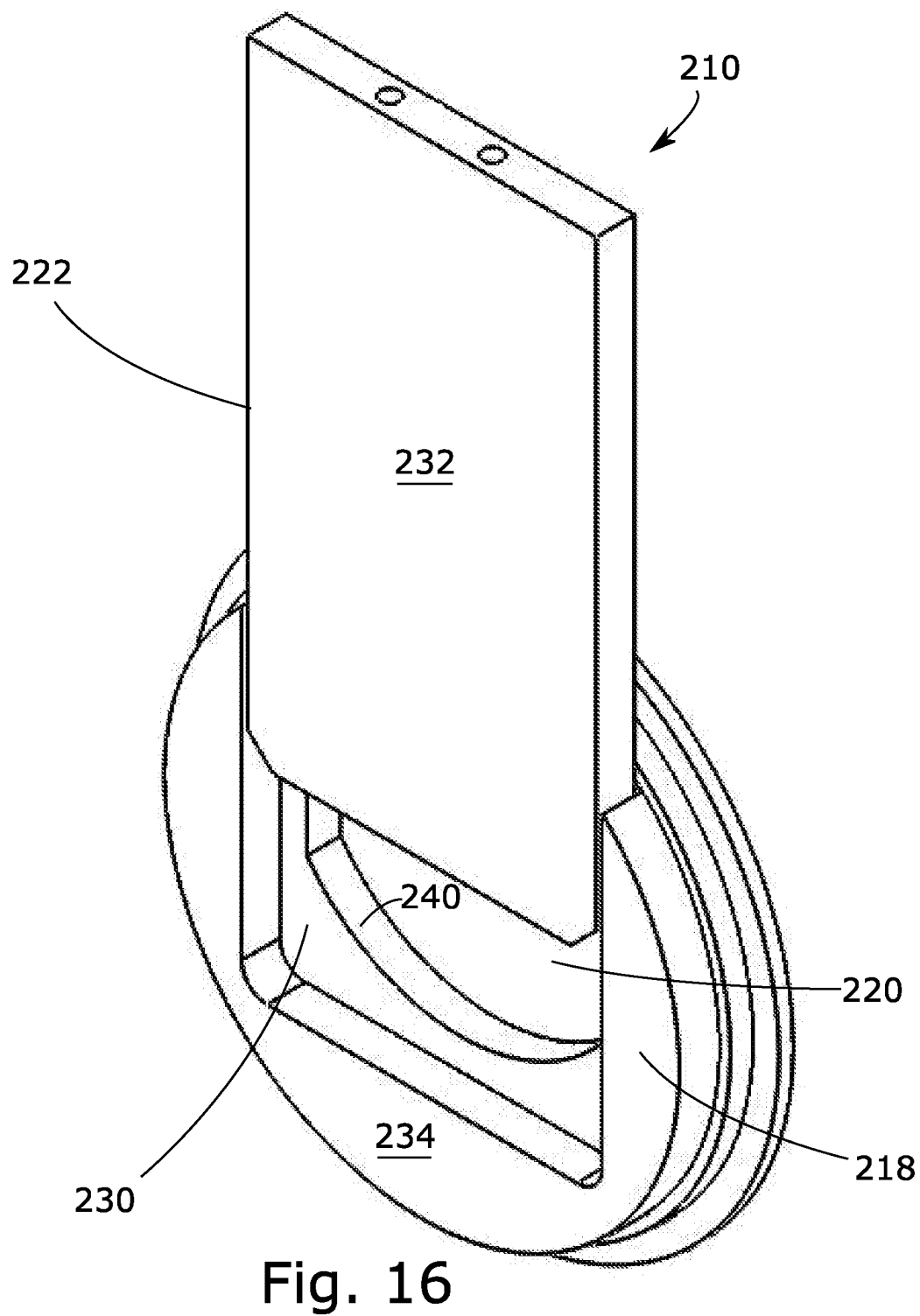
FIG. 16 is an isometric view of the gate and seat plate of the valve of FIG. 13.
Figure 17:
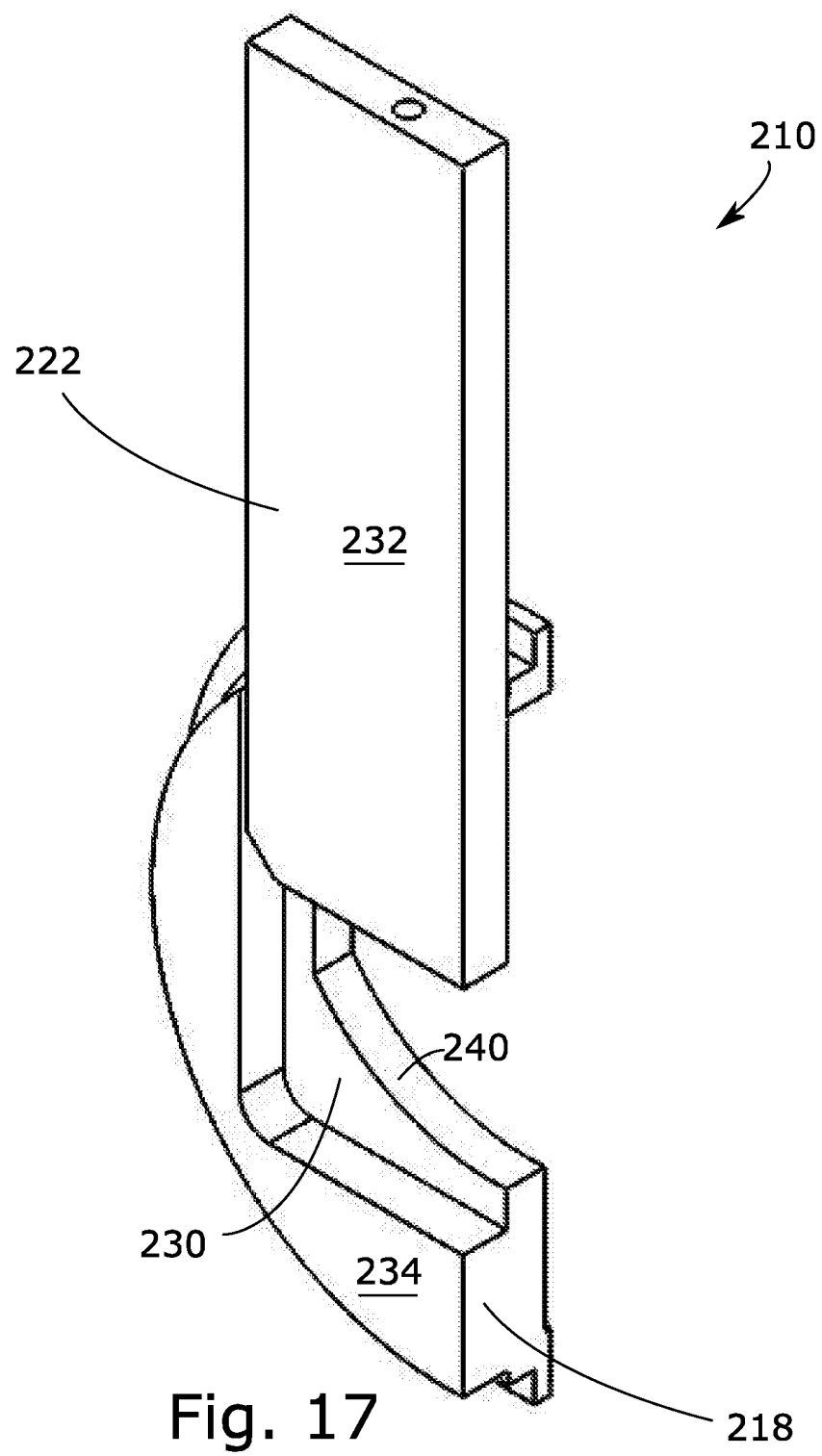
FIG. 17 is a cutaway isometric view of the gate and seat plate of the valve of FIG. 13.

FIG. 16 is an isometric view showing the seat plate 218 and gate 222 of FIGS. 13-15, better showing the three-dimensional shape of the components in this embodiment. FIG. 17 is a cutaway isometric view showing the view of FIG. 16 with a vertical cut.

Figure 18:
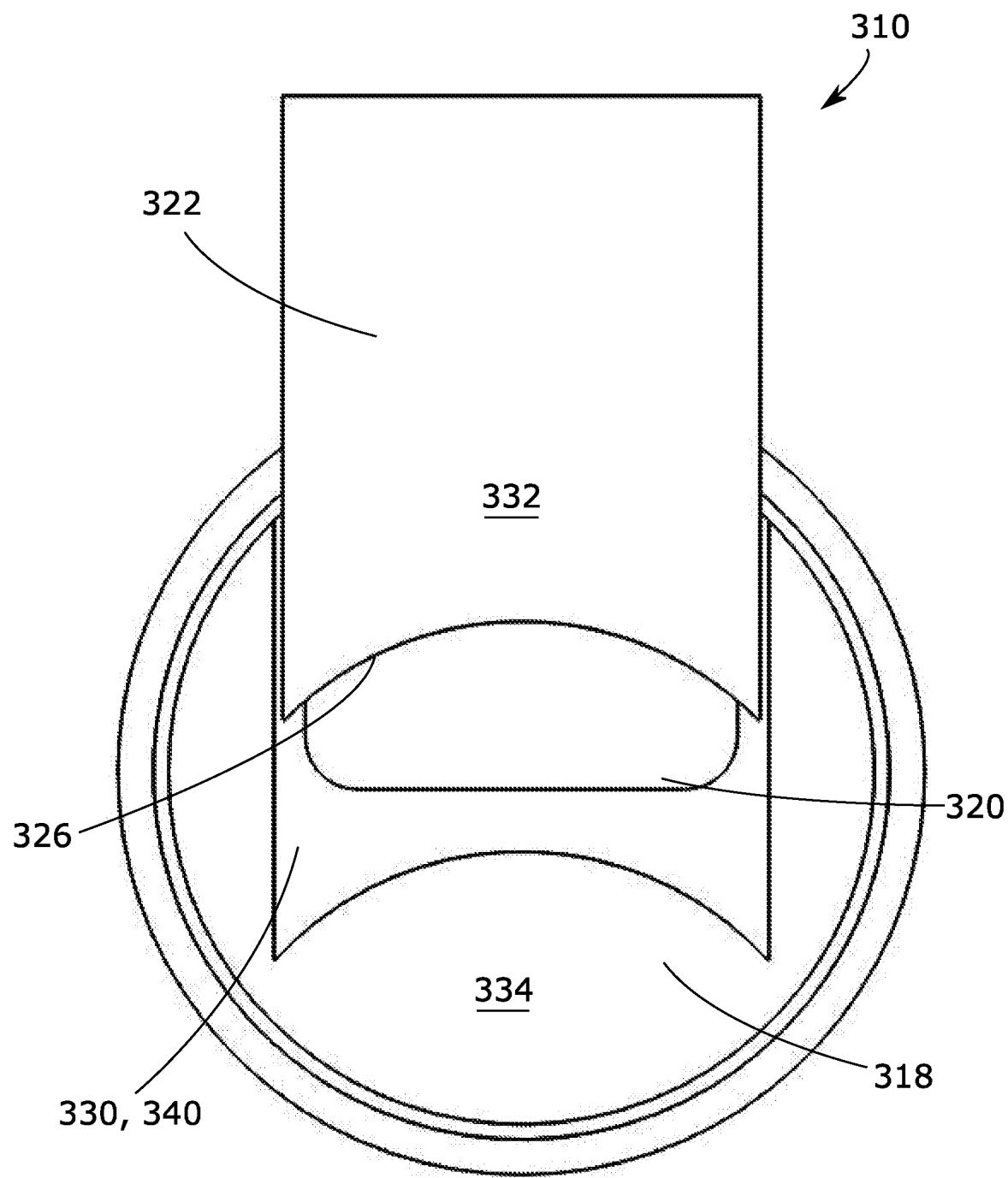
FIG. 18 is a front view of the gate and seat plate of an additional exemplary valve.

The embodiments of FIGS. 5-17 do not include a gate with a concave edge as shown in FIGS. 1-4. A seat plate with a recesses face can also be combined with a gate with a concave edge as shown in FIGS. 18-21. FIG. 18 shows a front view of the gate 322 and seat plate 318 of a valve 310, the gate 322 having a concave edge 326 which can be flush with the bore when in a retracted position (retracted position not shown). The opening 320 in this particular embodiment has a rectangular shape with rounded corners, as does the opening 120 of the embodiment of FIGS. 5-12. In order to allow the gate to completely obstruct the opening, the bottom edge of the recessed face of the seat plate can be formed in a corresponding shape as shown, or the lip 340 can extend below the opening sufficiently far that the gate can obstruct the opening even having a shape very different from the shape of the recessed face. The gate 322 of FIG. 18 has an upstream surface 332 which can be coplanar with upstream surface 334 of seat plate 318. The recessed face 330 in this embodiment is shaped to match the shape of gate 322. Lip 340 defines the opening 320.

Figure 19:
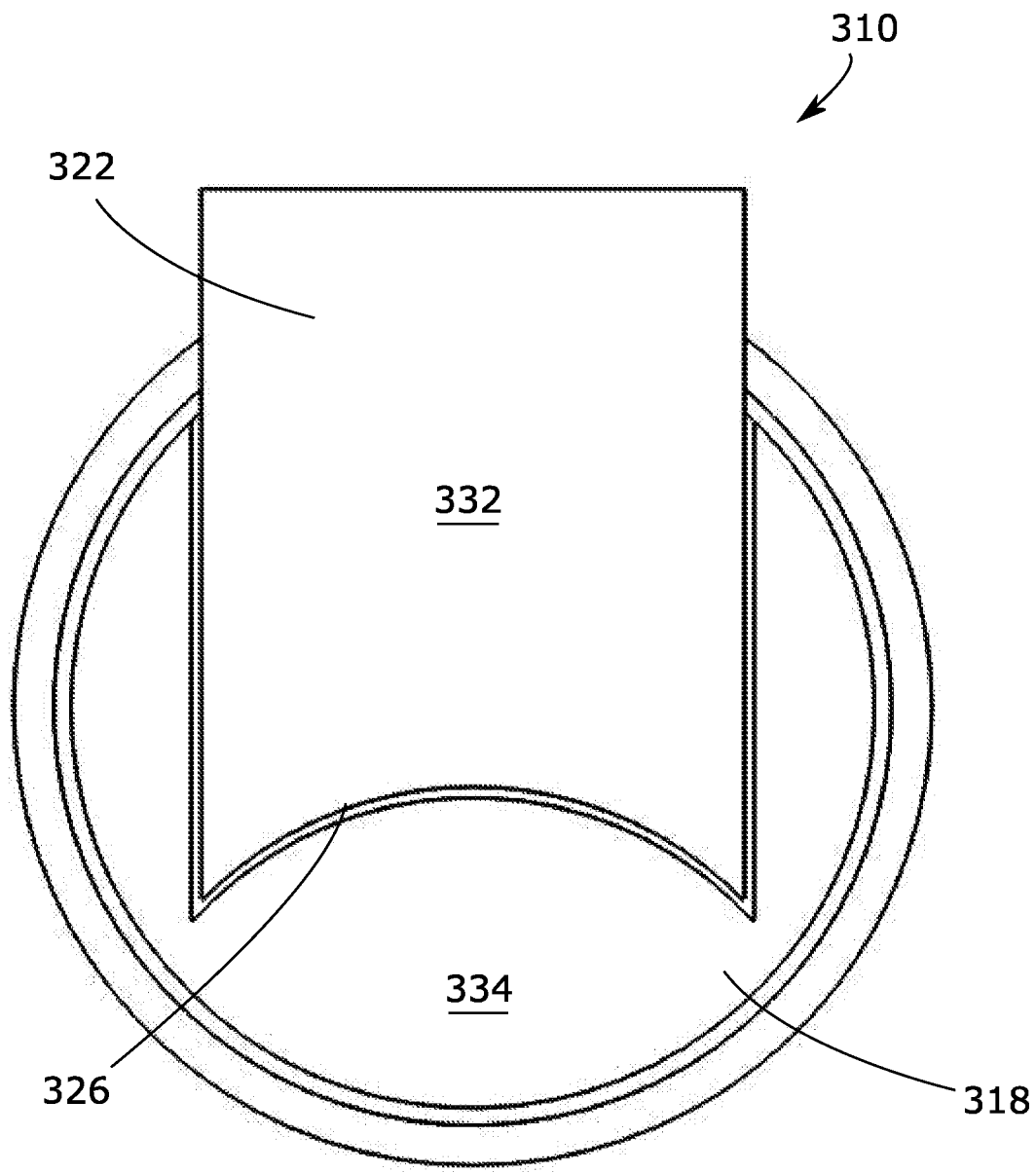
FIG. 19 is a front view of the gate and seat plate of the valve of FIG. 18, with the gate in an extended position.
Figure 20:
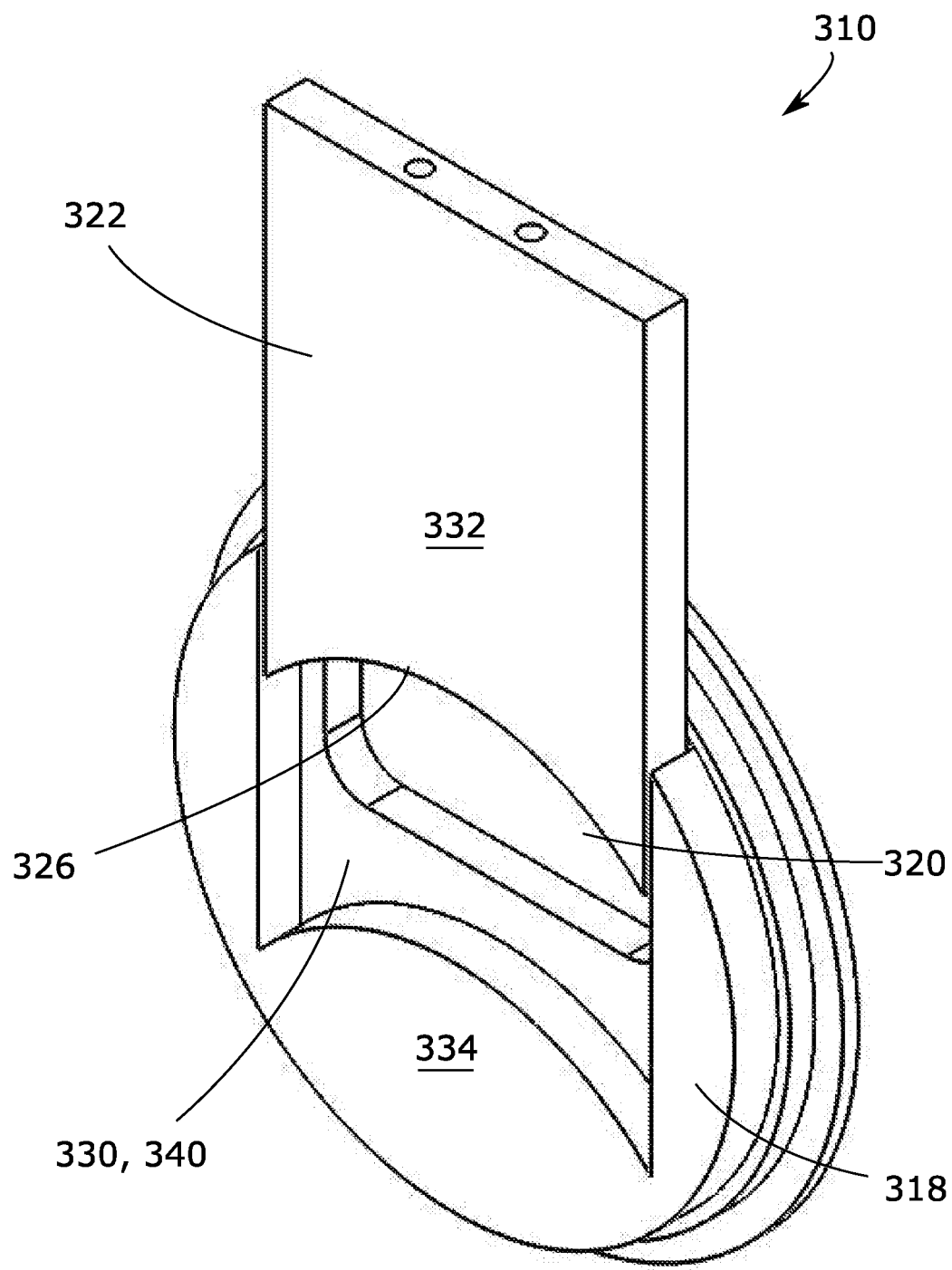
FIG. 20 is an isometric view of the gate and seat plate of the valve of FIG. 18.
Figure 21:
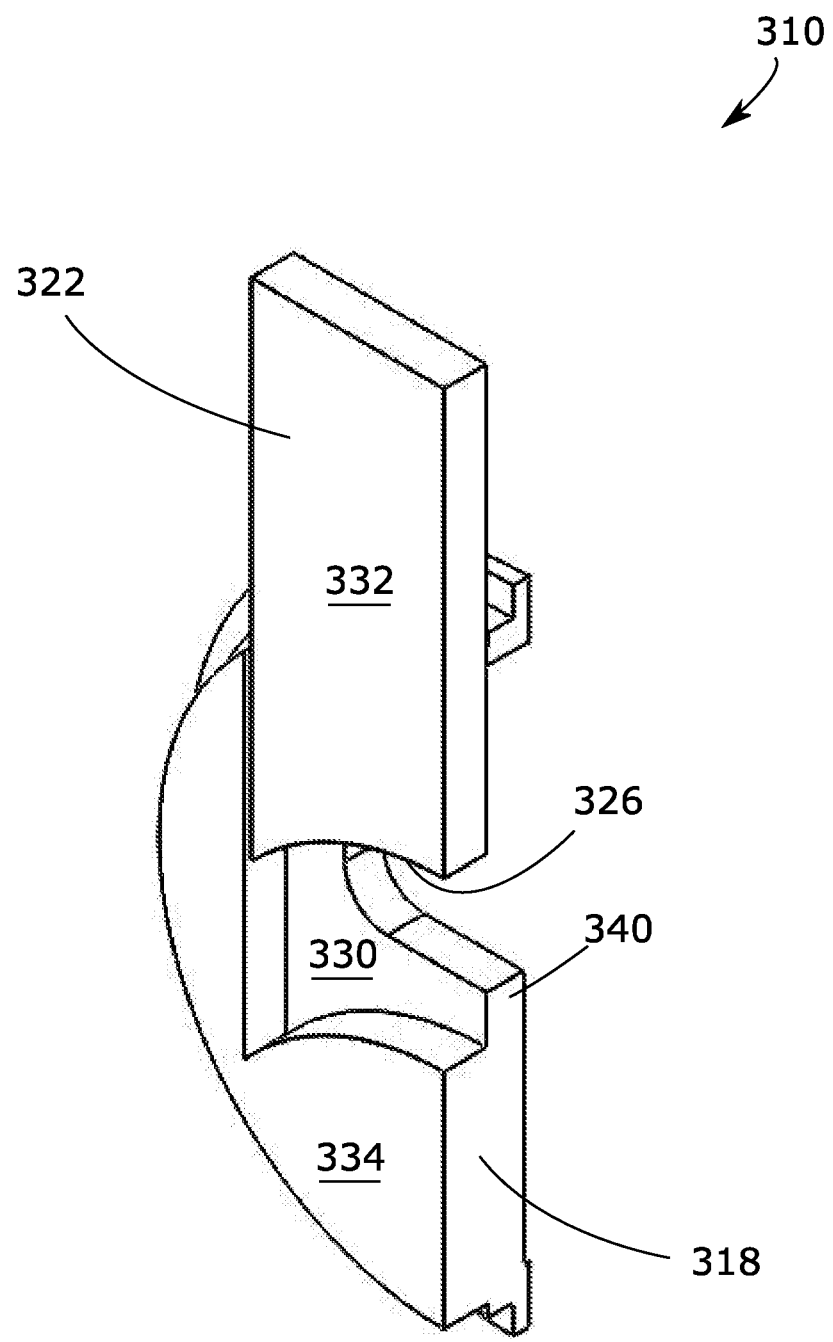
FIG. 21 is a cutaway isometric view of the gate and seat plate of the valve of FIG. 18.

In FIG. 19 the gate 322 is shown in an extended position covering the opening. FIG. 20 shows an isometric view the gate 322 and seat plate 318 of the valve 310. FIG. 21 shows a cutaway isometric view of the gate 322 and seat plate 318 of the valve 310 with a vertical cut plane.

Figure 22:
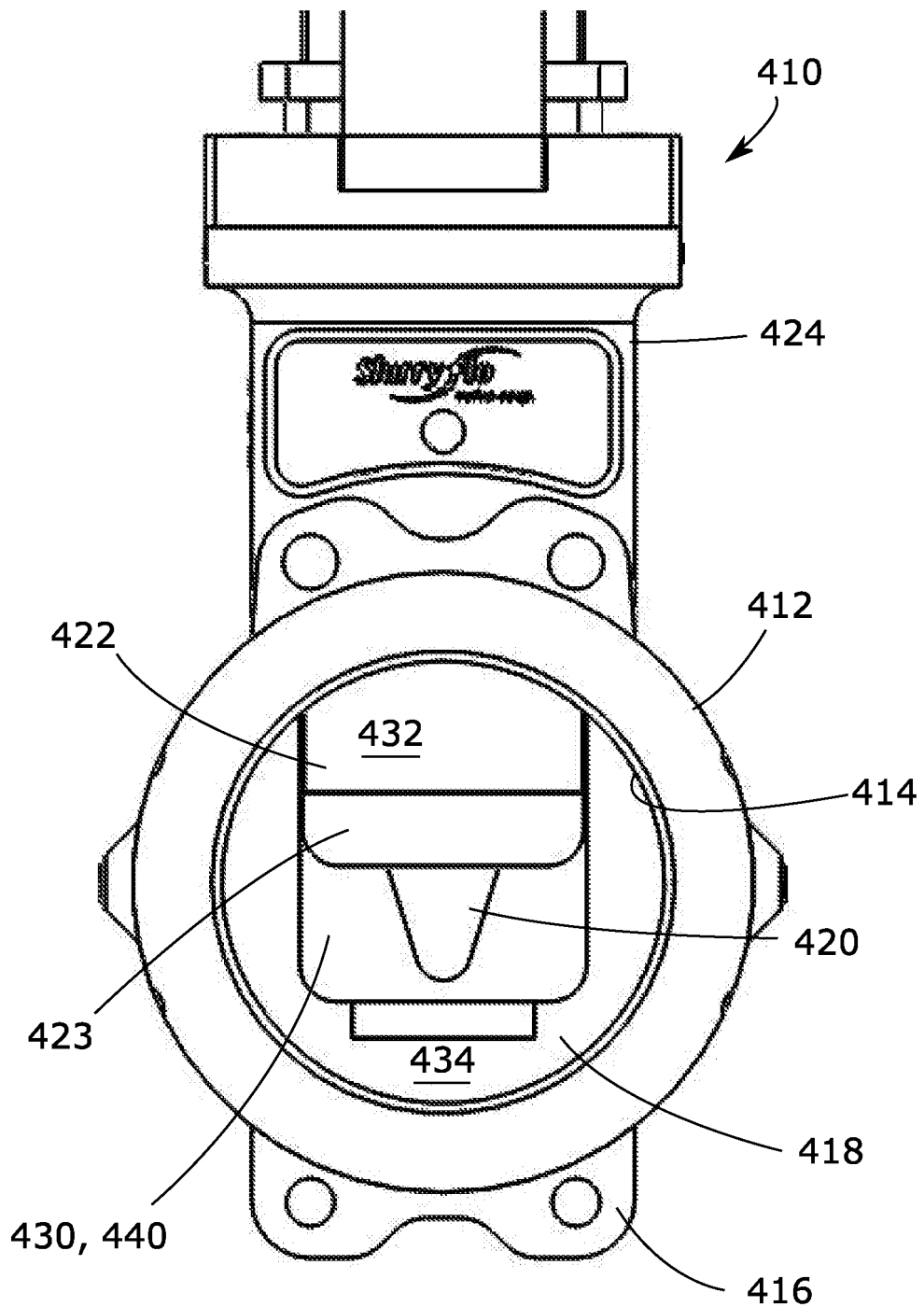
FIG. 22 is a front view of a further exemplary valve.

FIG. 22 shows a front view of another embodiment of a valve 410. This embodiment has a seat plate 418 with a recessed face 430 having a lip 440 defining an opening 420, the opening 420 being V-shaped. The valve guide 424 and the bore 414 of valve body 412 may be similar to their counterparts described in relation to other embodiments. In this embodiment, the valve body 412 has rings 416 instead of a flange. This feature may also be applied to other embodiments. The gate 422 has in in this embodiment a tip 423 which may be formed of a more wear resistant material than the rest of the gate 420. This feature may be applied to other valve embodiments.

Figure 23:
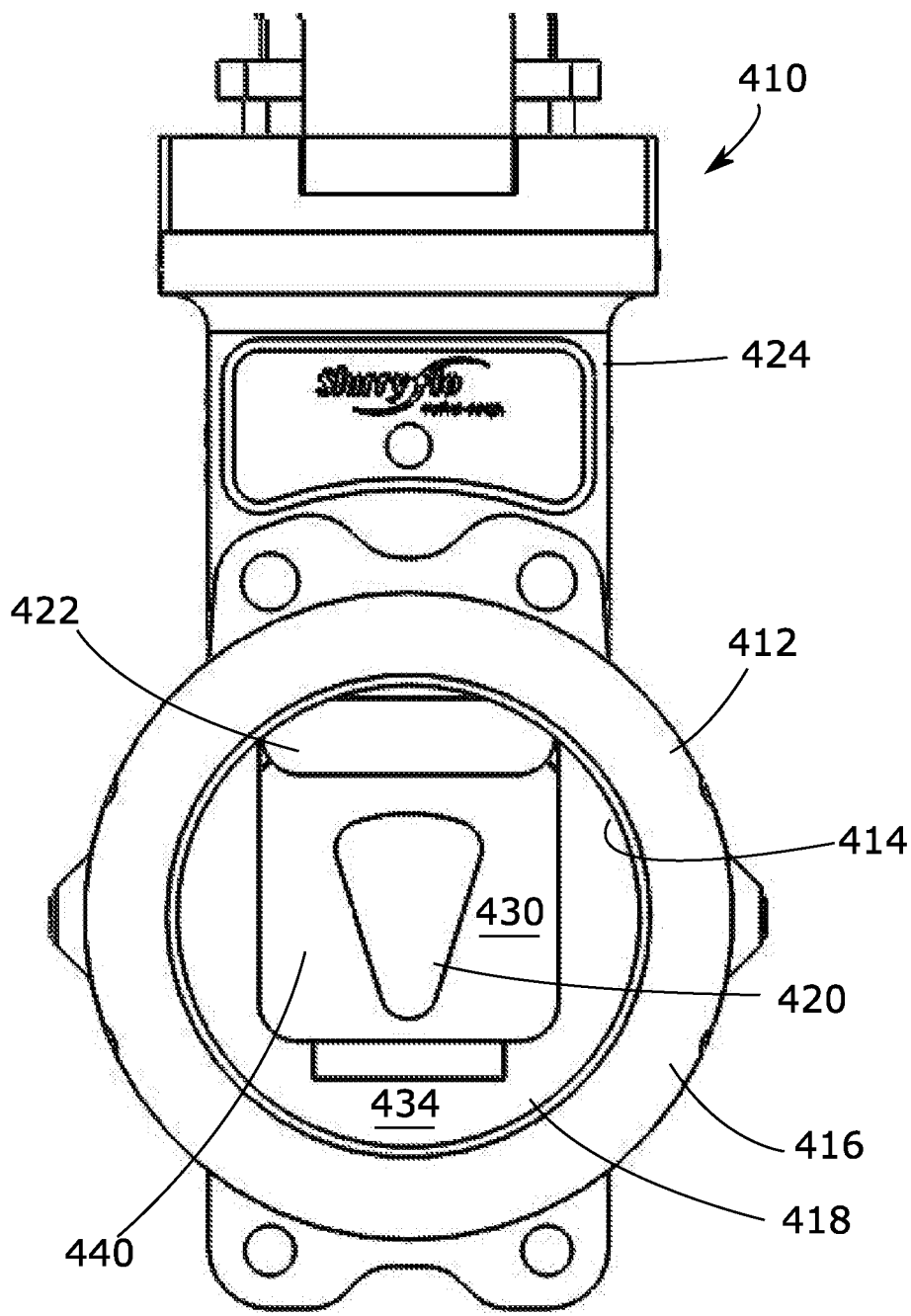
FIG. 23 is a front view of the valve of FIG. 22 with the gate in a retracted position.

FIG. 23 shows the valve 410 of FIG. 22 with the gate 422 in the retracted position. In this embodiment, the gate 422 still sticks part way into the bore in the retracted position. The opening 420 also does not extend to the edge of the bore. Either or both of these features may also be present in other embodiments with different shapes of opening.

Figure 24:
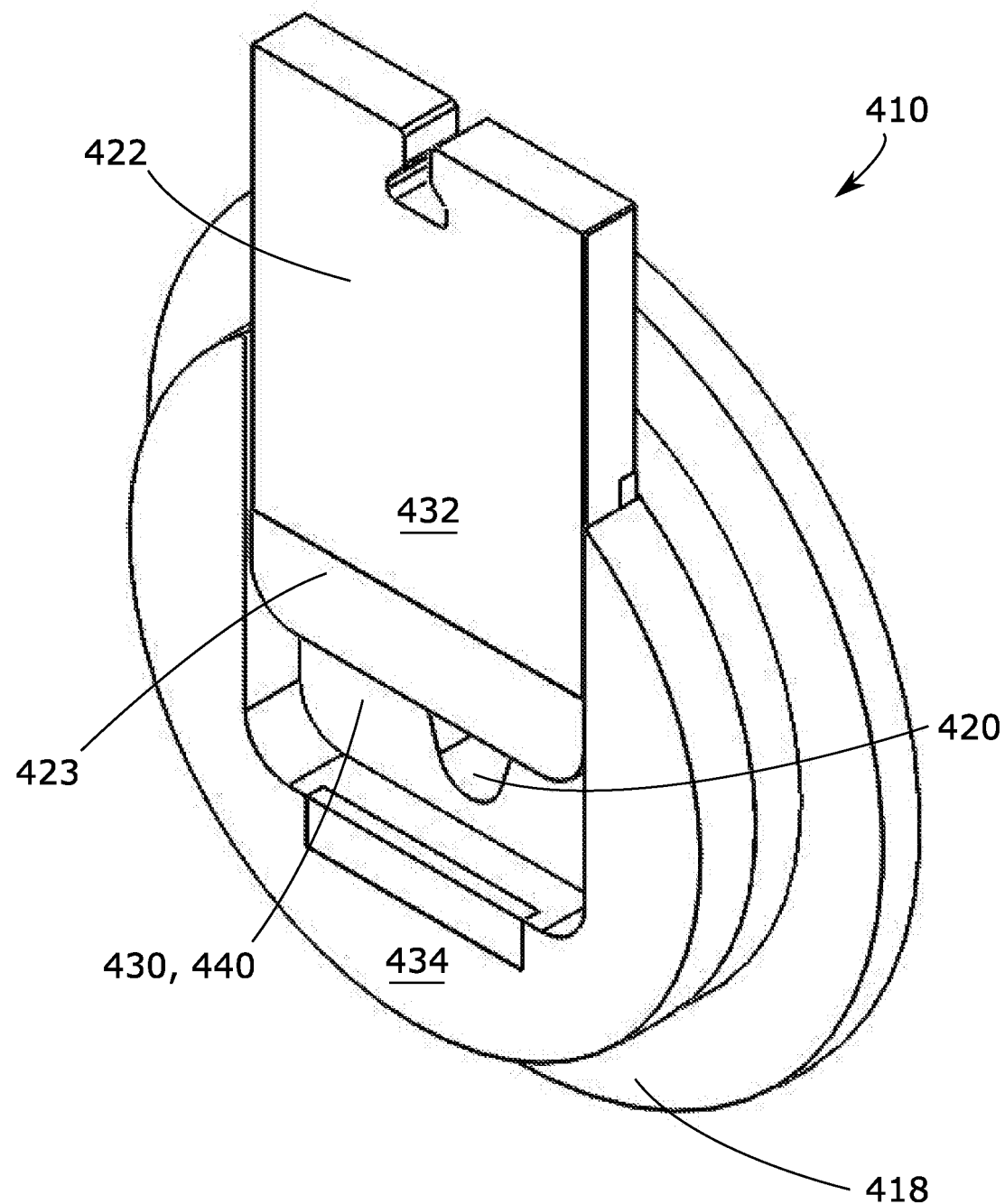
FIG. 24 is an isometric view of the gate and seat plate of the valve of FIG. 22.
Figure 25:
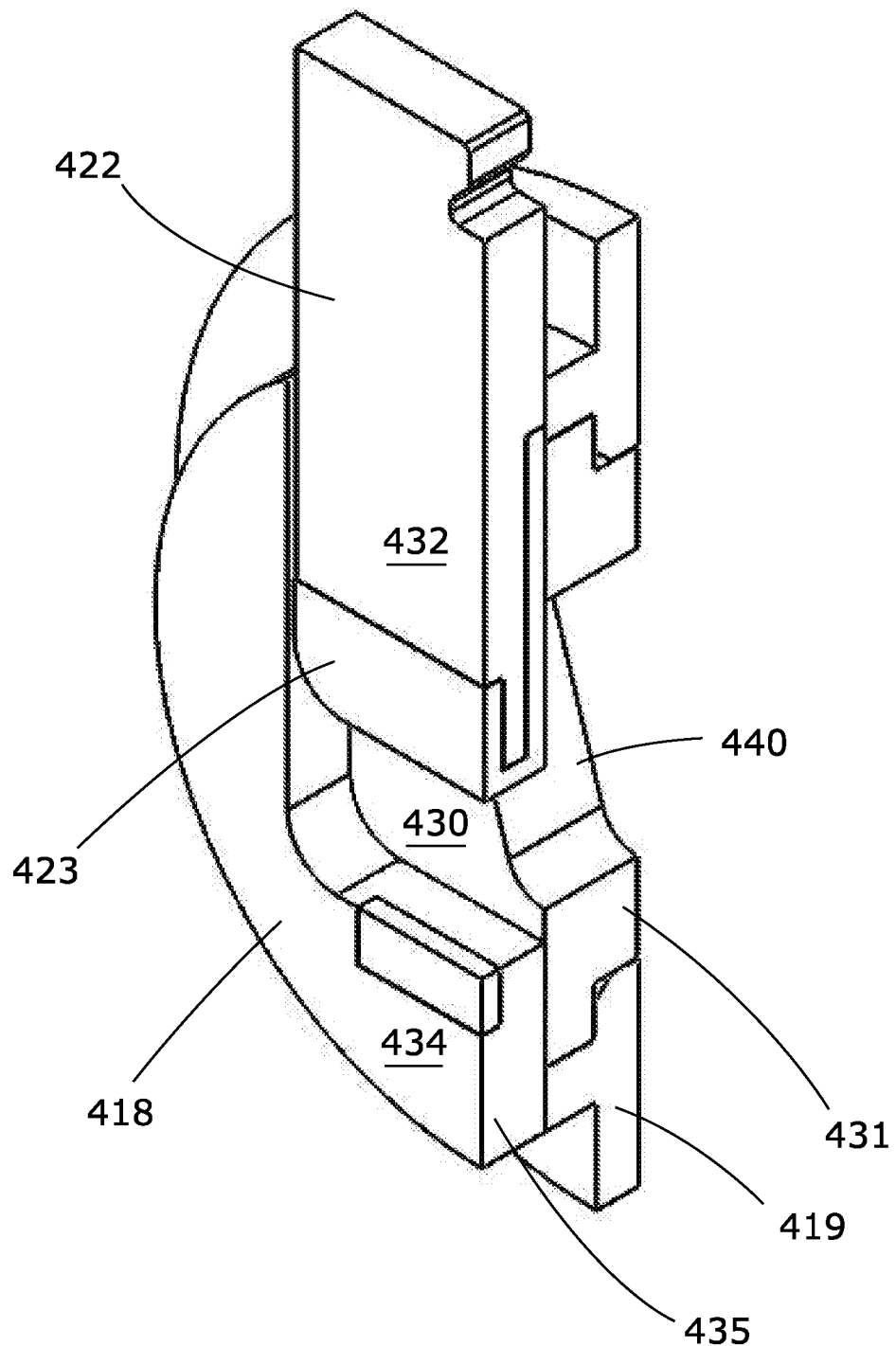
FIG. 25 is a cutaway isometric view of the gate and seat plate of the valve of FIG. 22.

FIG. 24 shows an isometric view of the gate 422 and seat plate 418 of the valve 410 of FIGS. 22-23. FIG. 25 shows a cutaway isometric view. In FIG. 25, the seat plate 418 can be seen to be formed of several components. The upstream face 434 can be seen to be formed on a first planar component 435 which is attached to another component 431 that forms the recessed face 430. A third component 419 includes an outer flange for positioning the seat plate 418 relative to other valve components. This split seat plate may also be present in other embodiments; the seat plate 418 can also be formed in one piece.

Figure 26:
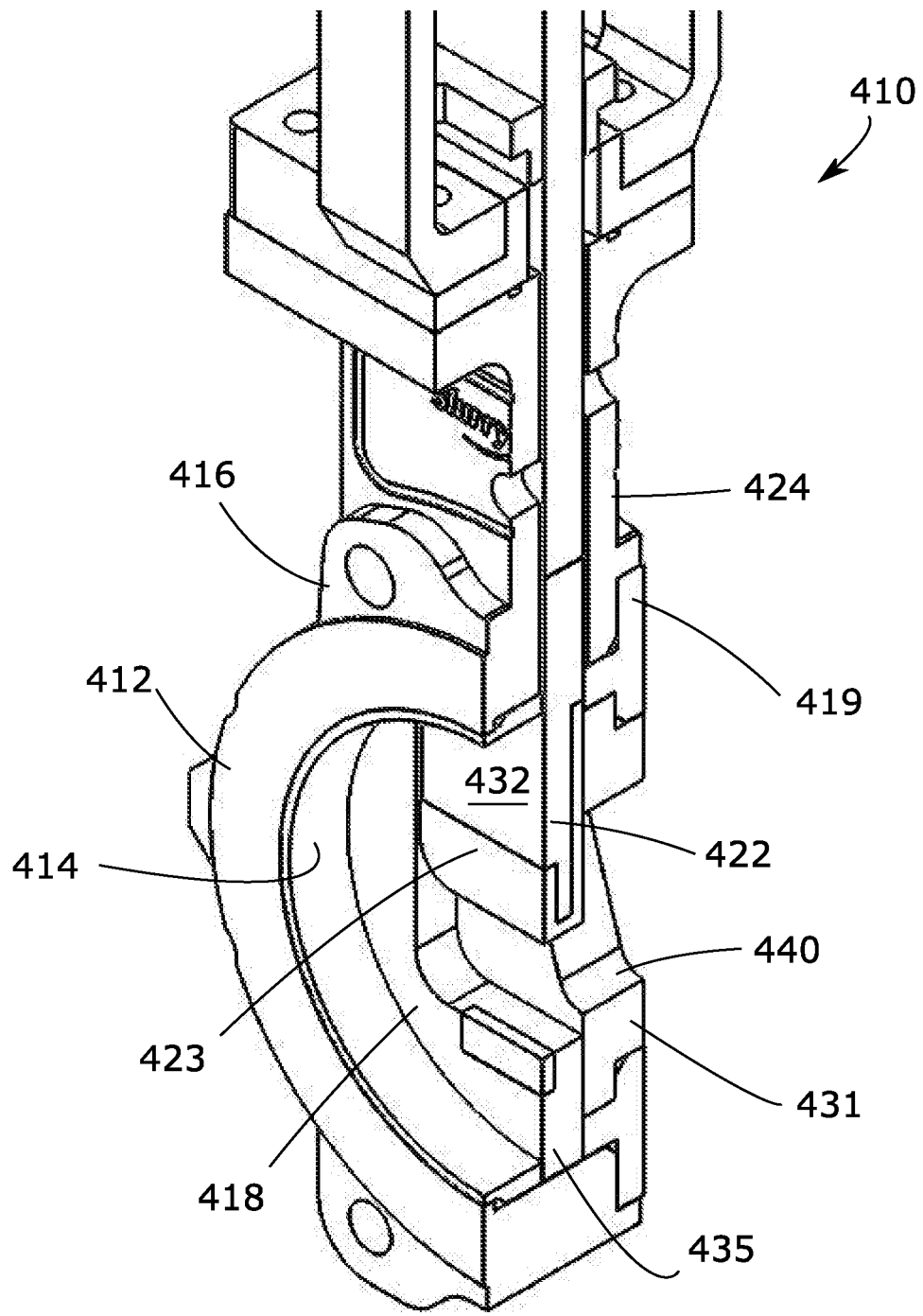
FIG. 26 is a cutaway isometric view of the valve of FIG. 22.

FIG. 26 shows a cutaway isometric view of the valve of FIGS. 22-25, showing the relationship of seat plate 418 to other components of the valve in this embodiment.

In some embodiments, such as the embodiment of FIGS. 5-12, the opening is generally rectangular, but any opening shape may be used. Different shaped openings result in different flow and control characteristics, and different changes in unobstructed opening area and flow rate as the gate moves. Each embodiment shown has a single opening, but there could also be multiple openings in other embodiments. The control characteristics of a valve with a rectangular opening tend to be relatively linear.

The recessed face removes a geometric imbalance referred to as an "off-set" in the flow direction. In the design of FIGS. 1-4, the gate stands proud of the seat plate based on thickness of the gate. If the gate is 5 cm thick then the leading edge (front face) of the gate is 5 cm "off-set" or proud from the seat plate. This is a geometric imbalance or an asymmetric shape geometry. The recessed face as shown in the embodiments of FIGS. 5-26 removes that asymmetric feature which exists in the design of FIGS. 1-4. This results in a delayed flow separation on the discharge side of the seat plate which in turn significantly reduces flow deflection to the top of the pipe.

In the embodiments shown, the recessed face has a maximum extent away from the guide that does not extend to a wall of the bore opposite the valve guide. This makes the unobstructed portion of the opening relatively centered within the bore when the gate is close to the extended position.

In the claims, the word "comprising" is used in its inclusive sense and does not exclude other elements being present. The indefinite articles "a" and "an" before a claim feature do not exclude more than one of the feature being present. Each one of the individual features described here may be used in one or more embodiments and is not, by virtue only of being described here, to be construed as essential to all embodiments as defined by the claims.

The embodiments of the invention in which an exclusive property or privilege is claimed are defined as follows:

1. A gate valve comprising:
   a valve body defining a bore having a bore width;
   a guide attached to the valve body;
   a seat plate within the valve body, the seat plate having a recessed face in an upstream direction, the recessed face having a width less than the bore width and including a lip defining an opening in the seat plate; and
   a gate movable within the guide into the bore into an extended position at which the gate lies against the recessed face to obstruct the opening, and movable within the guide out of the bore from the extended position, in which the gate in the extended position has an upstream surface that is coplanar with an upstream surface of the seat plate outside of the recessed face.

2. The gate valve of claim 1 in which the gate has a width less than or the same as the width of the recessed face including the opening.

3. The gate valve of claim 1 in which the lip extends around the opening in a direction opposite to the guide.

4. The gate valve of claim 1 in which the lip extends around the opening in a direction towards the guide.

5. The gate valve of claim 1 in which the recessed face has a maximum extent away from the valve guide, the maximum extent of the recessed face away from the valve guide not extending to a wall of the bore opposite the valve guide.

* * * * *